United States Patent
Kpodzo et al.

(10) Patent No.: US 9,651,652 B2
(45) Date of Patent: May 16, 2017

(54) INTERFERENCE CANCELLATION SYSTEM FOR LOCATION AND DIRECTION FINDING

(71) Applicant: L-3 Communications Corporation, New York, NY (US)

(72) Inventors: Elias Bonaventure Kpodzo, Franklin Park, NJ (US); Robert Holland, Moorestown, NJ (US)

(73) Assignee: L3 TECHNOLOGIES, INC., New York, NY (US)

( * ) Notice: Subject to any disclaimer, the term of this patent is extended or adjusted under 35 U.S.C. 154(b) by 629 days.

(21) Appl. No.: 14/175,840

(22) Filed: Feb. 7, 2014

(65) Prior Publication Data

US 2014/0218240 A1 Aug. 7, 2014

Related U.S. Application Data

(60) Provisional application No. 61/762,017, filed on Feb. 7, 2013.

(51) Int. Cl.
*G01S 3/02* (2006.01)
*G01S 5/02* (2010.01)
*G01S 19/21* (2010.01)

(52) U.S. Cl.
CPC ............ *G01S 5/0215* (2013.01); *G01S 19/21* (2013.01)

(58) Field of Classification Search
CPC ................. G01S 5/0215; G01S 19/21

(Continued)

(56) References Cited

U.S. PATENT DOCUMENTS 5,247,309 A * 9/1993 Reich .................... H01Q 3/2676
342/175
9,185,674 B2 * 11/2015 Sauer .................... H04W 64/00
(Continued)

FOREIGN PATENT DOCUMENTS

CN 1014509 A * 4/2009

OTHER PUBLICATIONS

Breslin, Donald F., "Adaptive Antenna Arrays Applied to Position Location", The Bradley Department of Electrical and Computer Engineering, Aug. 1997, 67 pages.

(Continued)

*Primary Examiner* — Frank J McGue
(74) *Attorney, Agent, or Firm* — Condo Roccia Koptiw LLP

(57) ABSTRACT

Systems and methods for cancelling interference while performing direction/location. A combined signal of interest plus interference signal may be received. A copy or sample of the interference signal may be determined. The interference signal and the combined signal of interest plus interference signal may be converted to the optical domain. The interference signal may be optically phase shifted by −180 degrees, which may result in an optically inverted interference signal. The optically inverted interference signal may be variably optically attenuated and/or variably optically time delayed. As a result, interference cancellation of the interference signal from the combined signal of interest plus interference signal may be achieved, resulting in 50 dB or more of cancellation of the interference signal. Direction and/or location finding techniques can be applied to received signals during and/or after interference cancellation.

10 Claims, 8 Drawing Sheets

(58) Field of Classification Search
USPC .......................................................... 342/450
See application file for complete search history.

(56) References Cited

U.S. PATENT DOCUMENTS

| | | | | |
|---|---|---|---|---|
| 9,344,125 B2* | 5/2016 | Kpodzo | ............... | H04B 1/1027 |
| 9,444,502 B2* | 9/2016 | Kpodzo | ............... | H04B 1/1027 |
| 2011/0287720 A1* | 11/2011 | Cox | ................ | H04B 1/525 |
| | | | | 455/63.1 |
| 2012/0294608 A1* | 11/2012 | Prucnal | ................ | H04K 3/228 |
| | | | | 398/39 |

OTHER PUBLICATIONS

Costabile, Jim, "Wireless Position Location", Virginia Tech Wireless Symposium, Jun. 4, 2010, 45 pages.

Elliott, Robert S., "Antenna Theory and Design", Prentice Hall, ISBN 0-13-038356-2, Jul. 1981, 608 pages.

Farkasvolgyi et al., "Effect of Antenna Space on MIMO Channel Capacity in Practicable Antenna Structures", Progress in Electromagnetics Research Symposium Proceedings, Moscow, Russia, Aug. 18-21, 2009, pp. 1065-1068.

Gazzah, Houcem, "Optimum Antenna Arrays for Isotropic Direction Finding", IEEE Transactions on Aerospace and Electronic Systems, vol. 47, No. 2, pp. 1482-1489, Apr. 2011, pp. 1482-1489.

IEEE, "Global Positioning System—the Newest Utility", Aerospace and Electronic Systems Magazine, IEEE, vol. 15, No. 10, Oct. 2000, pp. 89-95.

Kafedziski, Venceslav, "Direction Finding Part 2: Array Signal Processing, Errors, Location Calculation", INAAcademy Workshop, Spectrum Management Series Worksop 3: Measurements and Techniques, University, Ss Cyril and Methodius, Skopje, Republic of Macedonia, Mar. 30-Apr. 1, 2004.

Lui et al., "Experimental Study of Mutual Coupling Compensation in Direction Finding using a Compact Antenna Array", Asia-Pacific International Symposium on Electromagnetic Compatibility, Apr. 12-16, 2010, pp. 842-845.

Schmidt, R. O., "Multiple Emitter Location and Signal Parameter Estimation", Proceedings of RADC Spectrum Estimation Workshop, 1979, pp. 243-258.

Tarighat et al,, "CDMA Location Using Multiple Antennas and Interference Cancellation", The 57th IEEE Semiannual Vehicular Technology Conference, vol. 4, Apr. 22-25, 2003, pp. 2711-2715.

Tarighat et al., "Improved Wireless Location Accuracy Using Antenna Arrays and Interference Cancellation", Proceedings IEEE International Conference on Acoustics, Speech, and Signal, vol. 4, Apr. 6-10, 2003, pp. 616-619.

* cited by examiner

INTERFERENCE CANCELLATION SYSTEM FOR LOCATION AND DIRECTION FINDING

CROSS-REFERENCE TO RELATED APPLICATIONS

This application claims the benefit of U.S. Provisional Patent Application No. 61/762,017, filed Feb. 7, 2013, the contents of which are hereby incorporated by reference in their entirety.

JOINT RESEARCH AGREEMENT

This application discloses subject matter that may have been made as a result of activities undertaken within the scope of a joint research agreement between L-3 Communications Telemetry-East and Bascom Hunter Technologies, Inc.

BACKGROUND

When detecting and receiving a radio signal of interest (SOI), electromagnetic interference (e.g., radio frequency (RF) interference) may make it difficult to successfully identify and/or process the radio SOI (e.g., data signal). For example, an interfering radio signal may be present across the portion of the radio spectrum used for the transmission of the SOI. The interference caused by the interfering signal may prevent, obstruct, or otherwise degrade the ability of a receiver to receive and interpret the SOI. The interfering signal may be natural (e.g., RF radiation from the sun or other natural source, background noise, etc.) or artificial (e.g., a transmitting radio, an electrical circuit that includes rapidly changing electrical currents, etc.).

Electromagnetic interference may be intentional or unintentional. For example, jamming devices may be designed to emit narrowband and/or broadband interfering signals in order to disrupt the radio communications of a target. Unintentional interference may be due to spurious/out-of-band emissions of radios operating in frequency bands at or near the frequency utilized for transmitting/receiving a signal of interest.

SUMMARY

Disclosed herein are methods and systems for determining the location of a radio transmitter and/or receiver in high interference environments. For example, a first radio may include an antenna array. The antenna array may be used to receive signals that are transmitted by a second radio. The location or position of the second radio may be unknown to the operator of the first radio. The first radio may experience interference that interferes with transmissions from the second radio. The interference source may be a jammer and/or may be a remote interference source. The first radio may have a direct sample of the interfering signal and/or may estimate the interfering signal, for example using a directional antenna and an interference estimation processor.

Due to the high interference environment, the first radio may perform interference cancellation on one or more of the signals received over the plurality of antennas included in the antenna array. The signals received over each of the elements of the antenna array may be a combined signal of interest (SOI) and interference signal (e.g., the received signal includes both an SOI component transmitted by the second radio and the interference signal from the interference source). The first radio may receive and/or determine a sample of the interference signal. There may be a corresponding SOI for each of the elements of the antenna array of the first radio. The interference may be cancelled from each of the received SOI+interference signals in order to estimate the position of the second radio based on the information included in the plurality of SOIs. The location determination may be performed based on the relative amplitude, phases, timing, and/or the like differences in the SOIs received via the elements of the antenna array. The relative positions/geometry of the elements in the antenna array may be used to determine the location of the transmitting second radio based on the relative amplitude, phase, timing, and/or the like differences in the SOIs as determined after interference cancellation.

To determine the SOIs from each of the elements in the array, the combined signal of interest and interference signals for each of the antenna array elements and/or the sample of the interference signal may be variably attenuated and/or variably delayed in the RF domain prior to being transformed to the optical domain. The RF variable attenuation and/or variable delay may increase the maximum operational range(s) of delays and/or gain ratios between the combined interference and SOI signals and the interference signal received separately from the signals of interest. The interference signal may be converted to the optical domain and optically phase shifted by −180 degrees (e.g., 180 degrees), which may result in an optically inverted interference signal. The optically inverted interference signal may be variably optically attenuated and/or variably optically time delayed, for example based on a detected output power of the optical portion of the interference cancellation system.

The optically inverted interference signal may be individually combined with one or more the signals received via the elements of the array (e.g., each of the combined SOI and interference signals received via the antenna array elements may be combined with a copy of the optically inverted interference signal or the interference cancellation may be performed for a single reference version of the SOI plus interference signal). The optical attenuation and/or optical time delay of the optically inverted interference signal may be varied in order to maximize the interference cancellation. For example, the optical attenuation and/or time delay of the optically inverted interference signal may be varied in order to attempt to minimize the relative output power associated with one or more of the outputs of the optical portion of the interference cancellation system (ICS) after the output has been converted back to the RF domain. The output from the optical portion of the ICS may correspond to the combination of the variably attenuated and optically time delayed optically inverted interference signal and one or more of the optically converted interference plus SOI signals received via the antenna array. By attempting to minimize the power associated with of the output of the optical portion of the ICS, a relative maximum amount of interference cancellation may be achieved.

The system may be configured to continuously update and/or adjust optical attenuation parameters and/or optical time delays, for example to maintain a desired level of interference cancellation. The optical attenuation parameters and/or optical time delays may be adjusted individually for each of the SOIs and/or may be adjusted using these same parameters for each of the SOIs (e.g., may assume the interference experience by each of the array elements is relatively similar). The power level of the signal output from optical portion of the system may be inversely related (e.g., proportional) to level of interference cancellation. For example, a lower power level output from the optical subsystem may correspond to a higher degree of interference cancellation.

In an example, on the signals received via a specified element of the antenna array may be designated as a reference signal. Relative phase differences, angle of arrival differences, and/or time of arrival differences for the signals received over the other elements of the antenna array may be determined with respect to the reference signal. In an example, interference cancellation may be performed from the reference signal to determine an SOI, but the relative phase differences, angles of arrival, and relative times of arrival for signals received via non-reference antenna elements may be determined based on differences measured between the reference signal and the combination of SOI plus interferer signal received via the other, non-reference antenna elements of the array.

Location parameters may be derived based on the characteristics of the plurality of SOIs received via the elements of the antenna array and the relative positions of the elements within the array. For example, trilateration and/or triangulation parameters may be determined based on the SOIs determined before (e.g., SOI plus interferer) and/or after (e.g., SOI) interference cancellation. If trilateration is used, the relative time delays, the relative phase shifts, and/or the relative amplitudes of the SOIs received from the second radio may be used in conjunction with the relative positions of the antennas within the array to determine the relative distance and direction the transmitting second radio is from each of the elements of the array. The distances may then be used to determine the approximate location of the transmitter based on the positions of the elements of the array.

If triangulation is to be used the angle of arrival, relative distances, relative time-difference of arrival, and/or trigonometric relationships may be used to determine the position of the transmitter. In an example, of trilateration is used, the relative time delays, the relative phases shifts, and/or the relative amplitudes of the SOIs received from the second radio and the relative positions of the antennas within the array may be used to determine the relative angle(s) of arrival (AOA), relative time(s) of arrival (TOA), and/or relative angle(s) of derivation or azimuth of the signal from the second radio. These triangulation parameters may then be used to determine the approximate location of the transmitter based on the positions of the elements of the array.

Additionally, disclosed herein are systems and methods for a wireless communication device to determine its approximate location based on transmissions emitted from known source locations, even if the wireless communication device is being jammed or is otherwise experiencing interference at or near the frequency used for the transmission sent from the known source locations. For example, interference may be removed from signals received from Global Positioning System (GPS) satellites in order for the wireless communication device to derive its location based on the signals received from the satellite. In another example, signals received from devices at fixed or known locations (e.g., wireless base stations, known radio transmitters, wireless access points, etc.) may be used to determine the location of the radio receiving the signals even if it is in a high interference environment.

DETAILED DESCRIPTION

Figure 1A:
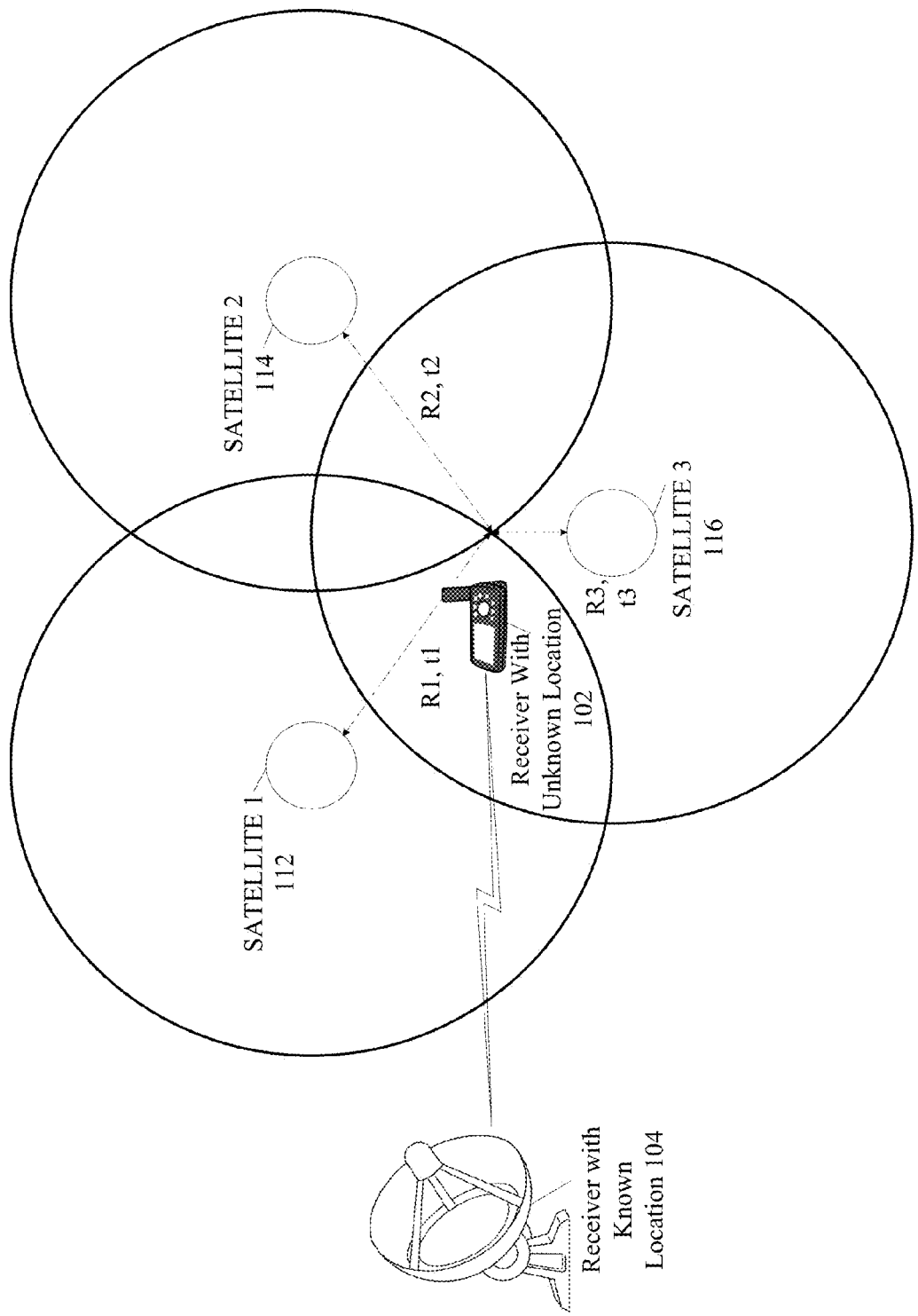
FIG. 1A illustrates an example of architecture for determining the location of a receiver based on signals received from satellites and an error correction signal received from a receiver with a known location.

RF jamming is used as a form of electronic warfare in order to disrupt enemy communication systems. For example, in order to protect military vehicles from mines and Improvised Explosive Devices (IEDs) that may be remotely detonated using RF communication systems (e.g., cell phones, pagers, garage door openers, etc.), a military vehicle may be equipped with a jammer that is designed to cause interference on frequencies utilized by the RF detonation system of the device. In this manner, the jammer can prevent the receiver at the explosive from successfully receiving the detonation signal. Garage door openers in the 300 MHz to 390 MHz frequency range and cell phones operating in the cellular, personal communications service (PCS), and/or Global System for Mobile Communications (GSM) frequency bands may be used to communicate with and/or detonate IEDs. Other types of devices and other frequency ranges may also be used.

To effectively jam hostile communications channels, a jammer may transmit high power, broadband signals in the same frequency bands that are often used for friendly communications. Thus, while protecting military vehicles by blocking enemy signals, many jammers may saturate the electromagnetic spectrum and may interfere with friendly signals. For example, friendly communication and navigation systems such as radios, cellular telephone systems, global positioning systems (GPSs) and other electronic equipment may also experience interference due to jammer operation. Such interference may compromise missions and may expose war fighters to intelligence-related dangers.

Further, in many scenarios RF signals may be used to determine position information for one or more of the radio transmitter emitting the RF signal or the radio receiver receiving the RF signal. For example, if the position of a radio receiver is known or fixed, information regarding the position of an RF transmitter can be determined based on the properties and/or signal levels of transmissions performed by the RF transmitter as seen by the receiver with a known location. Such techniques for determining position information of a transmitter operating at an unknown location based on measuring signals sent from the transmitter at a receiver with a known location may be referred to as direction finding. Direction finding techniques may be used to determine the direction from which a signal was transmitted and/or the actual location of the transmitting device.

In addition to determining the position of an unknown transmitter, RF signals can be used to determine the position of an RF receiver based on signals observed from one or more transmitters located at known positions. GPS is one example system used to determine the position of a receiver based on signals received from transmitters operating at known locations. Techniques such as triangulation and trilateration are example methods for determining the location of the receiver. Such techniques for determining position information of a receiver operating at an unknown location based on measuring signals sent from one or more transmitters with known locations may be referred to as location finding.

However, if a jammer is operating at frequencies at or near those used by a given transmitter, the resulting interference may make it extremely difficult for the receiver to successfully receive signals emitted by the transmitter and thus prevent the receiver from performing successful direction finding or location finding. Disclosed herein are methods and systems that allow the receiver and jammer to operate simultaneously even when both a jammer and a receiver are operating at or near the same frequency. Interference cancellation techniques are used to allow the receiver to successfully receive one or more signals during periods of jammer operation such that the receiver can successfully perform location finding and/or direction finding even while the jammer is operating over the same RF spectrum. The disclosed methods and systems may be seamlessly integrated with existing fielded equipment (e.g., jammers/interferers and radio transceivers) to minimize development and recurring costs for communication system deployment in the field, in the air, on ships, submarines, and/or the like. The systems and methods may be utilized in order to cancel interference caused by other jammers and/or radios operating at or near the frequency utilized to transmit/receive a signal of interest used by the receiver for direction finding and/or location finding.

The ICS systems disclosed herein may be applied to assist with direction finding and/or locating a transmitting radio transceiver. For example, a wireless communication device may attempt to receive multiple RF signals from multiple sources. A jammer that is in operation at or near the frequency of the multiple RF signals may be in operation during periods when the wireless communication device is attempting to receive the multiple RF signals. The wireless communication device may know the physical location from which each of the multiple sources are transmitting. Interference cancellation techniques may be utilized in order to cancel interference by the jammer at the receiver, allowing the receiver to successfully receive the RF signals.

Based on the time it takes for each of the RF signals to reach the wireless communication device and the knowledge of the location of the transmitters of each of the RF signals, the wireless communication device may determine its current position using techniques such as trilateration or triangulation. In an example, rather than determining a timing difference between the received signals, a frequency or phase difference may be used. Without utilizing the ICS, the receiver of the wireless communication device may be saturated by one or more interfering signals, and thus unable to successfully detect and/or receive the signals used for triangulation, preventing the device from successfully determining its current position.

Similarly, a wireless communication device that includes an antenna array may detect the position of a wireless transmitter by determining a difference in the amount of time (and/or phase, Doppler shift, amplitude, etc.) it takes for the transmission to reach each of the antennas in the array. Based on the determined timing/phase difference and the knowledge of physical configuration of the antennas within the array, the wireless communication device may determine the direction from which the transmission was received and/or an approximate location of the transmitter. The position may be determined using various techniques such as triangulation and/or trilateration.

When referred to herein, the term direction finding may refer to methods and systems for determining the direction from which a received signal was transmitted and/or the location from which a signal was transmitted. In an example, direction finding may be performed for signals received over multiple antennas, and the results of the direction finding for each of the antennas may be used to determine an approximate location of the transmitter using a technique such as triangulation. Such a technique may be based on the knowledge of the relative positions of each of the antennas used for the direction finding. However, since the techniques involved in direction finding and location finding may be similar depending on whether the location of the transmitter(s) or receiver is known, the examples described herein are not meant to be limited to a certain application. For example, techniques described herein for location finding with interference cancellation may be equally applicable to location finding with interference cancellation. Similarly, although a specific example disclosed herein may be described in terms of performing location finding with interference cancellation, the method may be equally applicable to performing direction finding with interference cancellation unless specifically noted to the contrary.

Direction finding may be performed using directional antennas. Directional antennas may be an antenna and/or antenna array that are more sensitive in certain directions than in other directions. Example directional antennas may include Yagi-Uda antennas, log-periodic antennas, corner reflector antennas, the like, and/or some combination thereof. By using an array of directional antennas and observing the amplitude and/or phase of the RF signal received via the different directional antennas, a receiver can determine location information for a given transmitter based on the receiver's knowledge of the physical configuration of the directional antenna array.

For example, pseudo-Doppler direction finding may be a technique that determines position information of a transmitter using phase information of signals received via different antenna elements of an antenna array. In an example implementation of pseudo-Doppler direction finding, a bearing estimate of the received signal may be determined by measuring the Doppler shift induced on the signal by sampling around the elements of a circular array. In practice, the technique could use a single antenna that physically moved in a circle, but in most scenarios it is more practical to use a multi-antenna circular array at the receiver with each antenna sampled in succession.

Another example approach for performing direction finding may be referred to as the Watson-Watt technique. The Watson-Watt technique may use two or more Adcock antenna pairs to perform an amplitude comparison on the incoming signal. An Adcock antenna pair may be a pair of monopole or dipole antennas that takes the vector difference of the received signal at each antenna in order to output a single measurement from the pair of antennas. Two of these pairs may be co-located but perpendicularly oriented to produce what can be referred to as the N-S (North-South) and E-W (East-West) signals that will then be passed to the receiver. In the receiver, the bearing angle can then be computed by taking the arctangent of the ratio of the N-S to E-W signal.

Another example approach for performing direction finding may be referred to as the correlative interferometer technique. The correlative interferometer method may be performed by comparing the measured phase differences of the signal as observed using an antenna array of known configuration at a known wave angle (e.g., reference data set). A comparison is made for different azimuth values of the reference data set, and the bearing is obtained from the data for which the correlation coefficient is at a maximum. In case the DF antenna elements have a directional antenna pattern, the amplitude may be included in the comparison.

By utilizing an ICS as disclosed herein for cancelling a known interferer, direction finding may be used to effectively locate a radio transceiver or wireless equipment in high interference scenarios. Similarly, the ICS can be used to assist the device in performing location finding under high interference environments. For example, the ICS may be used to cancel the interfering signal that is received over each of the direction finding antennas, such that the position of the transmitter and/or receiver may be accurately estimated. As an example, ships, aircraft, submarines, and/or vehicles may experience high-interference scenarios (e.g., a jammer may be used, there may be interference to receiving radios caused by local transmitting radios, etc.), but by using the systems and methods described herein, the position of the vehicle may still be determined despite the interference. The location of a transmitter may also still be determined despite the interference.

The Global Positioning System (GPS) is a widely used technology developed by the U.S. Department of Defense that may be used to determine a location of a GPS receiver anywhere across the globe. GPS is used in numerous applications and markets, for example commercial and private aviation, ship navigation, mapping and surveying, telecommunications position finding, recreational boating and hiking, etc. A typical GPS may include twenty-four Low Earth Orbiting (LEO) satellites in six near circular orbital planes of four satellites each. The satellites may be positioned such that a minimum of five of them is visible from every point on Earth at any given time.

Each satellite may then broadcast or transmit its respective location and a timing signal to GPS terminals (e.g., devices with a GPS receiver such as mobile phones, navigation systems, etc.). Many GPS terminals may receive signals from the GPS satellites, but typically the GPS terminals are low-power and do not communicate information back to the GPS satellites (e.g., the transmissions are unidirectional). The GPS terminal may determine an approximate distance to each satellite using the time delay of the received signal (e.g., by using Time-On-Arrival (TOA) technique and/or the like). If the GPS terminal determines the distances to four or more satellites, then the GPS terminal may then determine its own latitude, longitude, altitude, and timing offset, for example using trilateration.

FIG. 1A illustrates trilateration for a receiver with an unknown location using three signals received from satellites whose position are known, and a fourth signal received from a ground based transmitter with a known location. Such a technique may be referred to as differential GPS. Differential GPS may utilize two receivers, and the location of one of the receivers may be fixed or known. For example as shown in FIG. 1A, Receiver With Unknown Location 102 may receive GPS related signaling information from Satellite 1 112, Satellite 2 114, and Satellite 3 116 (and possibly other GPS satellites as well). Receiver with Known Location 104 may also be receiving GPS signals from the GPS satellites at a known location. Receiver with Known Location 104 may broadcast the difference between its position as indicated/determined based on the satellite transmissions and its known, fixed position. For example, Receiver with Known Location 104 may broadcast the difference between the measured satellite pseudoranges and actual (e.g., internally computed) pseudoranges. Receiver with Unknown Location 102 may correct its own pseudoranges (e.g., as determined from the satellite broadcast) based on the broadcast correction information received from Receiver with Known Location 104. The digital correction signal broadcast by Receiver with Known Location 104 may be broadcast relatively locally over ground-based transmitters of shorter range. Hence, Receiver with Known Location 104 may provide the timing errors for correction to Receiver with Unknown Location 102 whose location is unknown. Typically, the closer the two receivers are together, the better the accuracy. Such techniques can reduce errors in position determinations from on the range of 15 meters to less than a single meter.

However, both the transmissions exchanged between the two receivers and the transmissions exchanged between a satellite and a receiver may be subjected to interference that can disrupt the communications. As disclosed herein, an ICS system can be used with one or more of the receivers in order to allow for operable communications even in high interference environments.

Figure 1B:
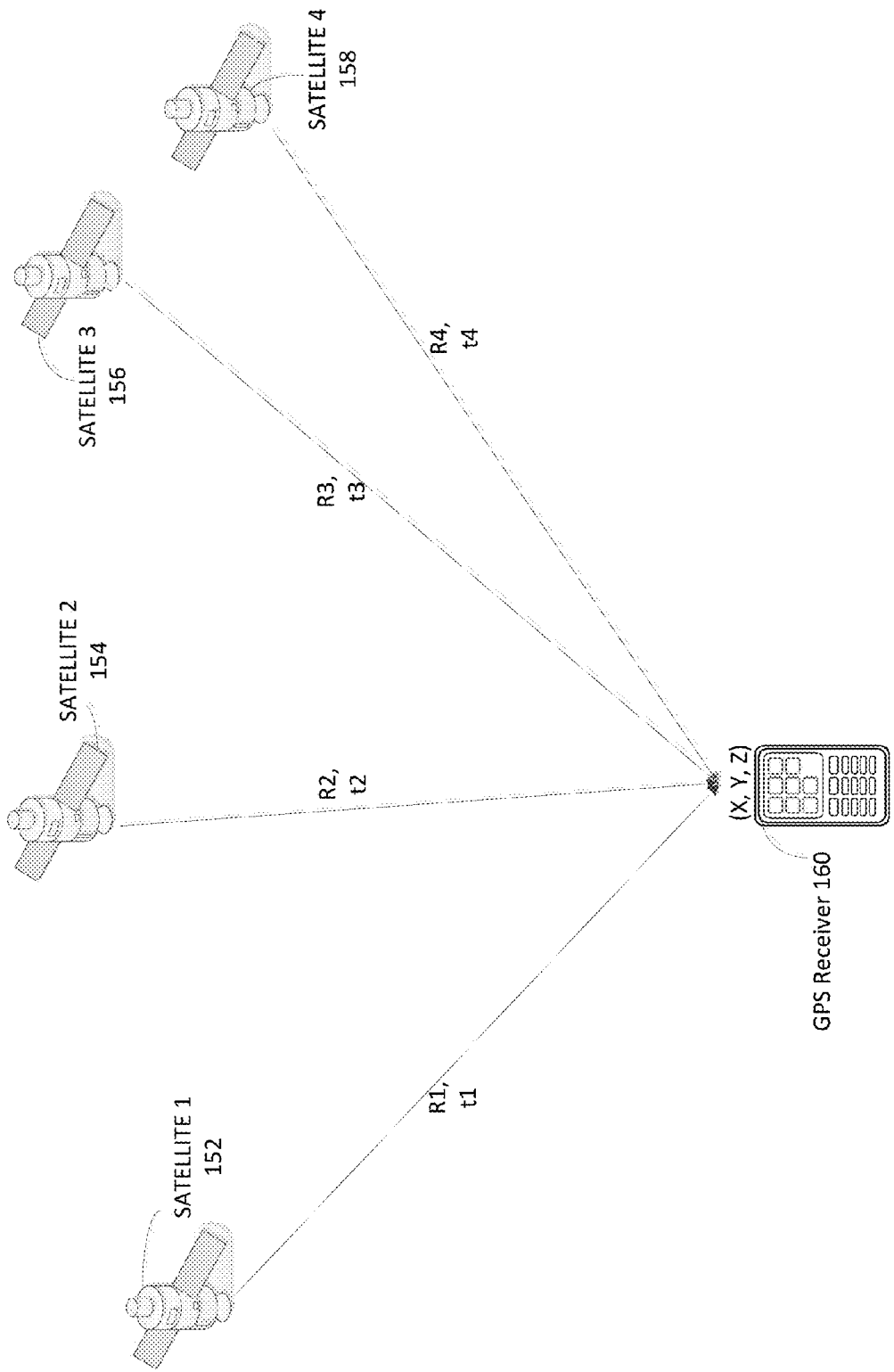
FIG. 1B illustrates an example Global Positioning System (GPS) architecture.

FIG. 1B illustrates trilateration for a receiver with an unknown location using four signals received from satellites whose position are known. In most scenarios, at least three satellites are used in order to accurately estimate the latitude and longitude of the GPS terminal Typically, the greater the number of satellites used for the determination, the more accurate the location determination will be. Each of the satellites may be referenced to very precise clocks, so that the timing differences between the signals may be determined at a sufficient accuracy for determining the location of a GPS terminal to within a few meters.

As an example, a GPS receiver may determine the travel/transmission time associated with a transmitted radio signals sent from a GPS satellite to the GPS receiver. The travel time may then be used to determine the distance from the GPS receiver to the satellite. By determining this distance for multiple satellites whose position are known, the GPS receiver may then use triangulation to determine its approximate location. GPS signals are typically transmitted at L-band frequencies L1 (e.g., 1575.42 MHz (10.23 MHz× 154)) and/or L2 (e.g., 1227.60 MHz (10.23 MHz×120)). The satellite transmissions typically utilize a bi-phase shift keying (BPSK) modulation scheme, and the GPS signals may be very weak by the time they reach the GPS receiver. Hence, the GPS receiver may be very sensitive and may expect a good/high signal-to-noise ratio at the receive antenna to ensure proper functionality. The GPS receivers may be susceptible to noise and interference/jamming. To ensure location estimation accuracy, the location of the transmitting satellites may be monitored and updated regularly, and corrections may be made to account for any delays caused to the RF signal due to the medium of transmission located between the GPS receiver and the satellite.

As shown in FIG. 1B, GPS Receiver 160 may attempt to determine its own current position based on signals received from one or more of Satellite 1 152, Satellite 2 154, Satellite 3 156, and/or Satellite 4 158. For example, the distance between Satellite 1 152 and the GPS Receiver 160 may be R1. GPS Receiver 160 may determine the distance R1 based on the amount of time it takes for a transmission from Satellite 1 152 to reach GPS Receiver 160 (e.g., t1) since the transmission is known to travel at the speed of light. Based on the knowledge that the GPS Receiver 160 is R1 (e.g., kilometers) away from Satellite 1 152, a sphere with radius R1 may be formed with the location Satellite 1 152 being used as the center of the sphere. GPS Receiver 160 may recognize that its position is located at some point on the surface of the sphere.

Such a process may be repeated for each of the satellites to be used by GPS Receiver 160 for it geolocation determination. For example, the location of each of the transmitting satellites and the time it takes for each of the respective transmissions to reach GPS Receiver 160 may be used to determine location spheres for each of the satellites. For example, a sphere of radius R2 may be formed with its center at the known location of Satellite 2 154. The location of the GPS Receiver 160 may therefore be expected to lie on the surface of both the sphere formed around Satellite 1 152 and the sphere formed around Satellite 2 154. The intersection between the two spheres may be a circle that is formed where the two spheres with radius R1 and R2 overlap with each other.

Similarly, a third measurement may be used to form a sphere of radius R3 with a center at the location of Satellite 3 156. The intersection of the three spheres may be two points located within the overlap of the first two spheres associated with R1 and R2. To determine which of two points corresponds to the actual location of GPS Receiver 160, a fourth measurement may be performed, for example based on a transmission from Satellite 4 158 (e.g., determine distance R4 based on t4). However, for most terrestrial applications, usually one of the two locations determined using R1, R2 and R3 can be logically rejected as the incorrect location (e.g., one point may be too far from earth or may be below the surface of the Earth), so that one of the two locations may be determined to be correct even if a fourth source is not available. GPS-based systems are used extensively for wireless radio equipment location finding worldwide due to the availability of low-cost GPS terminals/receivers. However, the transmissions from the satellites may be subject to interference from various sources.

Additionally, with the proliferation of cellular and other wireless communication systems, transmissions from access points such as wireless base stations (e.g., Node Bs, evolved Node Bs, etc.) and wireless routers (e.g., Wi-Fi routers) may be used for determining the position of a receiver rather than or in addition to transmissions from GPS satellites. For example, transmissions from wireless base stations whose locations are fixed or known may be used as the references for the determination of latitude, longitude, altitude, and/or timing offset (e.g., using a trilateration technique).

The receiver position determination using base stations or access points is performed in a manner similar to that used for determinations based on transmissions from GPS satellites. In this case, however, the satellites are replaced or supplemented with base stations (e.g., for code-division multiple access (CDMA), Global System for Mobile Communications (GSM), Wideband-CDMA (WCDMA), Long Term Evolution (LTE), High-Speed Packet Access (HSPA+), etc.) with known locations as the references for the distance measurements and timing error corrections. In this architecture, the Angle-Of-Arrival (AOA), the Time-Of-Arrival (TOA), the Time-Difference-Of-Arrival (TDOA), and/or the Signal Power may be parameters used for the relative distance estimations. For location determinations, the system may use one or more of triangulation (e.g., based on bearing angles), trilateration (e.g., based on the distance from Multiple Known Reference Points/Base Stations), proximity (e.g., based on knowledge of the closest reference point/base station/wireless transceiver), fingerprinting information (e.g., receive-signal-strength (RSS), Multipath Effects, etc.). and/or the like in any combination.

In example, location finding for wireless terminals (e.g., CDMA, GSM, WCDMA, LTE, HSPA+, etc.) in the presence of channel noise and interference due to multiple users within the communication network may be achieved. For example, the reference locations used to estimate the location of the terminal may be base stations fitted with multiple antennas. Parameters such as multipath propagation, temporal and spatial conditions of the channel, and/or the locations of scatterers (e.g., wave reflective surfaces) may be used to estimate location based on the received signals. For example, the multiple antennas at the base station may be used to calculate the AOA and/or TOA parameters. The system may then apply a "Maximum Likelihood" and/or "Least-Squares" procedure(s) to the TOA and AOA, respectively, for the location estimation. For systems such as CDMA, Multiple Access Interference (MAI) cancellation techniques in the digital baseband domain may be implemented in order to improve the accuracy of the position estimate.

Irrespective of the specific architecture being utilized, in each of the position estimation techniques described above, parameters such as the distance between a fixed or known source/location are estimated using location and/or timing signals from satellites or some other base station with a known location. The radius values may be determined based on the received signal strength and/or using timing errors for correction of the measurements. In the presence of interference, these triangulation or trilateration techniques may be ineffective, as the receiver may be unable to successfully receive the transmissions used to determine the approximate distance the receiver is from the source.

Figure 2:
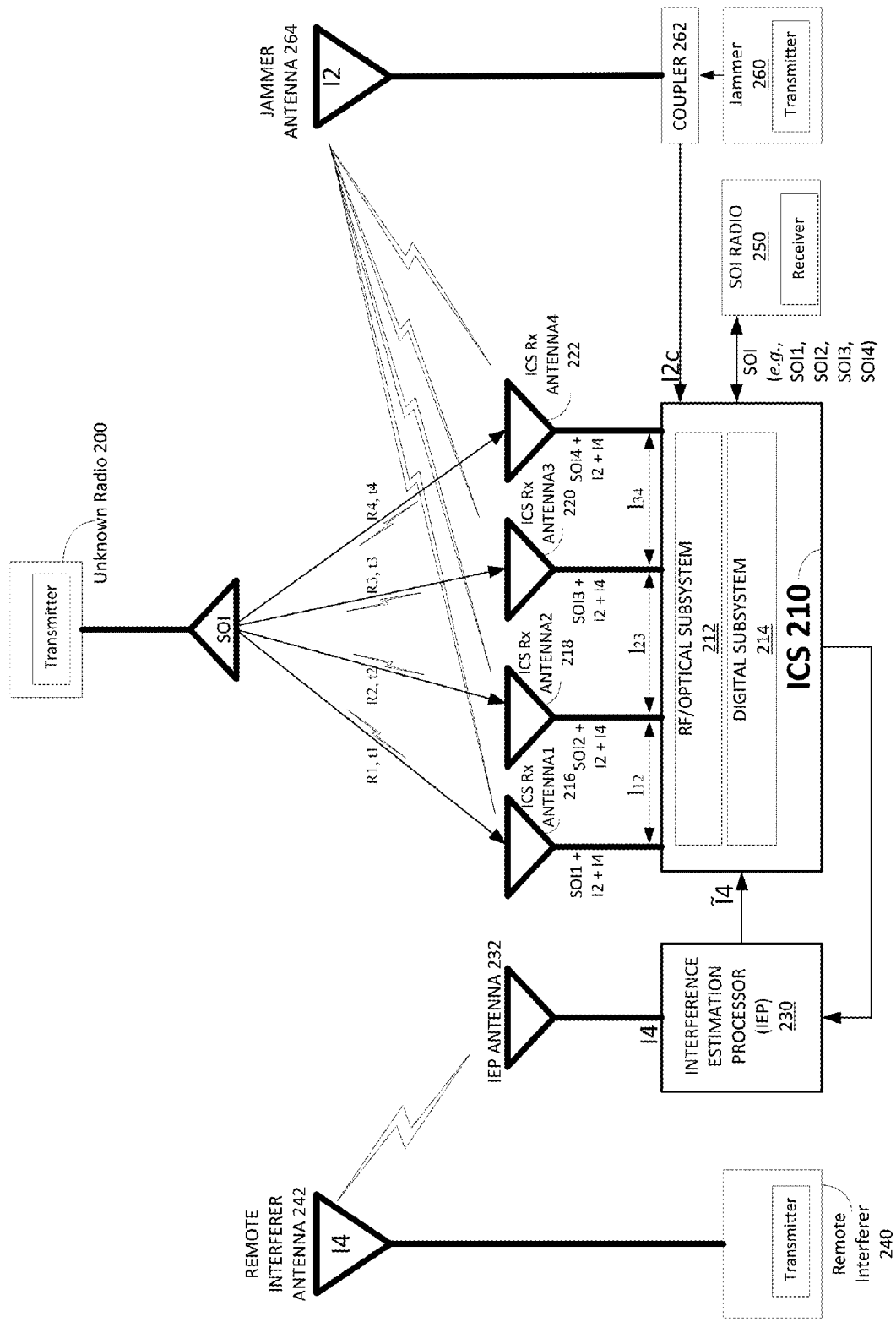
FIG. 2 is a system diagram of an example interference cancellation system (ICS) with an antenna array that may be used to cancel interference in order to determine the position of a radio transmitter at an unknown location.

Thus, disclosed herein are systems and methods for performing interference cancellation during position estimation. For example, FIG. 2 illustrates an example architecture that may be used to determine the position of a transceiver emitting an SOI (e.g., Unknown Radio 200 that includes a Transmitter transmitting signal SOI) even in the presences of interfering signals (e.g., interference caused by Remote Interferer 204 and/or Jammer 260). Similarly, systems and methods are disclosed for determining the location of a receiver that is receiving signals from multiple sources in order to determine its position (e.g., GPS and/or cellular triangulation/trilateration) even if the received signals are subject to one or more sources of interference.

For example with respect to FIG. 2, ICS 210 may be operably coupled to SOI Radio 250. SOI Radio 250 may include a receiver that is attempting to determine the location of Unknown Radio 220. Transmission sent from Unknown Radio 200 may be received via an antenna array that is coupled to ICS 210. For example, the antenna array may include ICS Rx Antenna1 216, ICS Rx Antenna2 218, ICS Rx Antenna3 220, and/or ICS Rx Antenna4 222, although more of fewer antennas may be used. Each of ICS Rx Antenna1 216, ICS Rx Antenna2 218, ICS Rx Antenna3 220, and/or ICS Rx Antenna4 222 may be comprised of a single antenna and/or itself be an antenna array (e.g., in order to act as a directional antenna). ICS Rx Antenna1 216, ICS Rx Antenna2 218, ICS Rx Antenna3 220, and/or ICS Rx Antenna4 222 may each receive an instance of SOI transmitted from Unknown Radio 200. For example, the SOI transmitted from Unknown Radio 200 may be received at ICS Rx Antenna1 216 as signal component SOI1. Similarly, ICS Rx Antenna2 218 may receive signal component SOI2, ICS Rx Antenna3 220 may receive signal component SOI3, and ICS Rx Antenna4 222 may receive signal component SOI4.

Transmissions from one or more of Remote Interferer 240 and/or Jammer 260 may interfere with the SOI transmission sent from Unknown Radio 200. For example, Remote Interferer 240 may be a remote interferer that is not physically coupled to or sampled by the system including SOI Radio 250 and/or ICS 210. Instead, Radio 1 may determine an estimate of the interference signal being transmitted by Remote Interferer 240 (e.g., I4) using Interference Estimation Processor (IEP) 230. Example techniques for determining a remote interfering signal and cancelling the remote interfering signal are disclosed in U.S. Provisional patent application Ser. No. 13/899,529, filed May 21, 2013 and entitled "Interference Cancellation with Remote Interferers," the contents of which are incorporated by reference herein in their entirety.

In another example, the receiving radio (e.g., SOI Radio 250) may be physically coupled to the interfering source (e.g., Jammer 260 via Coupler 262) and/or may have direct knowledge of the form of the interfering signal. In this case, ICS 210 may refrain from estimating the interfering signal since the interfering signal is already known. Such may be the case when a local jamming device is being used in the vicinity of SOI Radio 250 (e.g., Jammer 260 is on the same vehicle, ship, or aircraft as SOI Radio 250).

ICS 210 may be coupled to the antenna array in order to receive the signal from Unknown Radio 200 over multiple antennas. Although four antennas are shown in the array illustrated in FIG. 2 (e.g., ICS Rx Antenna1 216, ICS Rx Antenna2 218, ICS Rx Antenna3 220, and/or ICS Rx Antenna4 222), more of fewer antennas may be used. The relative positions of each of the antennas in the array may be known. In the example shown in FIG. 2, the antennas of the array are arranged in a linear manner, but other arrangements of the array may be used. In the example of a linear array, the distance between ICS Rx Antenna1 216 and ICS Rx Antenna2 218 may be expressed as $l_{12}$, the distance between ICS Rx Antenna2 218 and ICS Rx Antenna3 220 may be expressed as $l_{23}$, the distance between ICS Rx Antenna3 220 and ICS Rx Antenna4 222 may be expressed as $l_{34}$, etc.

The signals received over the different antennas of the antenna array may be used for the derivation and estimation of the location of Unknown Radio 200, for example using temporal and spatial delay variations of the channels between the Unknown Radio 200 and the array elements (e.g., ICS Rx Antenna1 216, ICS Rx Antenna2 218, ICS Rx Antenna3 220, and/or ICS Rx Antenna4 222). Although the ICS 210 of FIG. 2 is shown to use four array elements in FIG. 2, more or fewer elements may be used depending on the desired accuracy (e.g., N array elements, where N is an integer). An antenna array that includes N antenna array elements may be configured to perform N measurements of a combined SOI and interferer signal. For example, the signal received at ICS Rx Antenna1 216 may be expressed as SOI1 (e.g., the component of SOI transmitted by Unknown Radio 200 as observed at ICS Rx Antenna1 216) plus I2 (e.g., the component of interference received from Jammer 260 via Jammer Antenna 264) plus I4 (e.g., the component of interference received from Remote Interferer 240 via Remote Interferer Antenna 242). Similarly, ICS Rx Antenna2 218, ICS Rx Antenna3 220, and/or ICS Rx Antenna4 222 may receive signals SOI2+I2+I4, SOI3+I2+I4, and/or SOI4 +I2+I4, respectively.

Each array element may perform distance, amplitude, phase delay, and/or time delay measurements of the signal received from Unknown Radio 200 plus the one or more interfering signals. The signals received over each of the array elements (e.g., ICS Rx Antenna1 216, ICS Rx Antenna2 218, ICS Rx Antenna3 220, and/or ICS Rx Antenna4 222, etc.) may be used to derive the distance and time delay measurements with respect to Unknown Radio 200. The antenna elements may be based on technologies such as multiple-input multiple-output (MIMO) and radar measurement principles. However, in order to derive the relevant parameters for performing location finding on Unknown Radio 200 (e.g., R1, t1; R2, t2; R3, t3, R4,T4, etc.), SOI Radio 250 may need to determine SOI signal components SOI1, SOI2, SOI3, and SOI4. Since the antennas are also saturated with interference signals I2 and I4, ICS 210 may first remove or cancel the interference using RF/Optical Subsystem 212 and Digital Subsystem 214 as disclosed herein.

As noted above, different types of antenna arrays may be used to determine the relevant information for direction finding and/or location finding. For example, the array may be configured in various shapes or patterns, provided the physical configuration is known such that the currents experienced by the elements of the array share a known or specified amplitude relationship and/or phase relationship. The elements of the antenna array may be arranged as a fixed array (e.g., a fixed relationship physical and electrical arrangement with respect to each other) and/or may be a steerable array (e.g., a fixed physical arrangement but with electronic control over the amplitude and/or phase relationship between the elements). The antenna array may be parasitic or driven. The distances between adjacent array elements (e.g., $l_{12}$, $l_{23}$, $l_{34}$, in the linear array example in FIG. 2) may be set based on the wavelength/frequency used for transmissions from Unknown Radio 200. For example, the distance may be set such that the minimum values for the distances may be as low as $l/\lambda=0.3$ to 0.5, where $\lambda$ may be the wavelength of operation of ICS 210 and the Unknown Radio 200. In most scenarios, $l/\lambda \geq 1$.

Each antenna element may be configured to receive independent and/or less-correlated copies of the same RF signal (e.g., SOI transmitted by the Unknown Radio 200). For example, SOI may be transmitted from Unknown Radio 200 and may be received at Antenna 1 after the signal has traveled a distance of R1 in time t1. Similarly, transmission of the SOI from Unknown Radio 200 may be received at Antenna 2 after the signal has traveled a distance of R2 in time t2, may be received at Antenna 3 after the signal has traveled a distance of R3 in time t3, and may be received at Antenna 4 after the signal has traveled a distance of R4 in timer t4. Based on the different distances/time it takes for the SOI to reach each of the array elements, each array element may receive a slightly different instance of the SOI (e.g., SOI1 at ICS Rx Antenna1 216, SOI2 at ICS Rx Antenna2 218, SOI3 at ICS Rx Antenna3 220, SOI4 at ICS Rx Antenna4 222, etc.). For a generic Nth array element, the SOI may be expressed as SOIN and may be received at ICS Rx Antenna N after the signal has traveled a distance of RN in time tN.

In addition to receiving the signals transmitted by Unknown Radio 200, the antenna array elements may also receive the interference signals transmitted from Remote Interferer 240 (e.g., I4) and/or Jammer 260 (e.g., I2). The interfering signals may make it difficult to detect and or receive the SOI from Radio 3, as the interference signals may be transmitted on the frequency band used from transmissions of the SOI and the interference signals may be received at a much high power level than that of the SOI. Therefore, interference cancellation techniques may be used to cancel the interfering signals (e.g., I4 and/or I2) without significantly affecting the SOI.

In the example illustrated in FIG. 2, Jammer 260 the source of I2, and Jammer 260 may be co-located with SOI Radio 250/ICS 210. A sample of the I2 may therefore be coupled through the Coupler 262 and provided as an input to ICS (e.g., I2C) for interference cancellation. Remote Interferer 240 may be the source of I4, and Remote Interferer 240 may be remotely located and may be very far from ICS 250. Hence, a direct sample of the interference signal I4 may be unavailable at ICS 210. Instead, IEP Antenna 232 may be used to receive the interference signal. IEP Antenna 232 may be a directional antenna, and it may be configured to receive a high quality copy of the interferer signal I4. The sample of the I4 is detected in IEP 230 (e.g., the estimated interferer signal I4 may be expressed as $\tilde{I}4$), and down-converted to baseband for determination of transmission parameters such as frequency, amplitude, modulation scheme, etc. A realistic replica of the signal is then recreated in IEP 230 and after up-conversion is applied as $\tilde{I}4$ as an interferer input to ICS 210 for cancellation. Typically, a strong interferer signal from the remote interferer (e.g., Remote Interferer 240) reaches the directional IEP Antenna 232, and lower levels of the same interferer are received by the four receive antenna elements of the ICS (e.g., ICS Rx Antenna1 216, ICS Rx Antenna2 218, ICS Rx Antenna3 220, and/or ICS Rx Antenna4 222, etc.), so I4 may be cancelled by the ICS to improve the location calculation for the SOI Radio 250.

The received interference signals of FIG. 2 may be expressed as I2 and I4. In an example, measurements (e.g., elevation θ, azimuth Ø, time t, etc.) made and processed by Digital Subsystem 214 may be relative to and/or referenced to signal received via one of the elements of the array. For example, ICS Rx Antenna1 216 may be used as the reference antenna and the signal received via ICS Rx Antenna1 216 (e.g., SOI1+I2+I4) may be used as the reference signal. Measurements performed on the signals received via ICS Rx Antenna 2 218, ICS Rx Antenna3 220, and/or ICS Rx Antenna4 222 (e.g., on SOI2+I2+I4, SOI3+I2+I4, and/or SOI4+I2+I4, respectively) may therefore be referenced with respect to SOI1+I2+I4. Therefore, in an example I2 and/or I4 may remain uncancelled by the ICS during the location determination for Unknown Radio 200, although the cancellation of I2 and I4 may be performed to achieve acceptable levels of reception of SOI3 by SOI Radio 250 such that the SNR (Signal-To-Noise Ratio) and BER (Bit-Error-Rate) are acceptable.

The example system architecture in FIG. 2 illustrates an ICS with an antenna array with four elements, a single co-located Interferer (e.g., Jammer 264), a single remote interferer (e.g., Remote Interferer 240), a single radio transmitting a SOI (e.g., Unknown Radio 200), and a single radio for which interference from the receivers are to be cancelled (e.g., SOI Radio 250). However, additional local or remote interferers may be present, additional SOI transmitting radios may be present, and more or fewer antennas may be included in the antenna array. The insertion of the ICS into the location finding architecture of FIG. 2 may provide both narrowband interference cancellation and/or broadband multiple interferer cancellation. As a result, the cancellation process can improve the location calculation accuracy.

In order to properly detect the SOI from the SOI+I signal (e.g., SOI1 from SOI1+I2+I4, SOI2 from SOI2+I2+I4, SOI3 from SOI3+I2+I4, and SOI4 from SOI4+I2+I4 ), the ICS may be configured to use RF, optical, and/or digital signal processing (DSP) techniques to cancel the Interferer Signal from the SOI+I signal. For example, the ICS may include an RF Subsystem, an Optical Subsystem, and/or a Digital/Control Subsystem. The RF Subsystem, the Optical Subsystem, and/or the Digital/Control Subsystem may be configured to remove or cancel most or all of the Interferer Signal. The techniques utilized by the RF Subsystem, the Optical Subsystem, and/or the Digital/Control Subsystem are described in more detail below. Additional information regarding techniques utilized by the ICS are disclosed in U.S. Provisional patent application Ser. No. 13/899,368, filed May 21, 2013 and entitled "Interference Cancellation System," the contents of which are incorporated by reference herein in their entirety. Upon successfully cancelling the Interferer Signal(s), ICS 210 may send the SOIs to SOI Radio 250 to properly estimate the position of Unknown Radio 200. Further, although in the example shown in FIG. 2 Unknown Radio 200 is at an unknown location, if the location of Unknown Radio 200 is known, then the position of SOI Radio 250/ICS 210 may be determined based on the signals received via the antenna array.

ICS 210 may include one or more of optical components (e.g., an optical subsystem), radio frequency components (e.g., an RF subsystem), and/or digital signal processing components (e.g., a Digital/Control Subsystem) to perform interference cancellation. In an example, ICS 210 may convert RF and/or microwave input signals into optical signals. The ICS may use optical components to perform precise attenuation and time delay of the converted signal to achieve optimal cancellation depths across an instantaneous bandwidth of hundreds of MHz. For example, the system may operate to perform interference cancellation from high frequency (HF) bands (e.g., 3-30 MHz) to S bands (e.g., 2 to 4 GHz) and beyond.

The optical components of the ICS may be configured to perform precise inversion and recombination of two RF signals, which may be achieved with greater accuracy in the optical domain than in the RF domain. For the undesired interference signal to be perfectly or near-perfectly cancelled, the inversion process may result in an inverted interference signal that is nearly an exact replica of the original signal, except for the relative inversion. In the RF domain, it is difficult to achieve near-perfect replication of a signal over a wide range of frequencies. However, optical components may be configured to achieve near perfect replication and inversion during an inversion and recombination process.

By cancelling the majority of the interferer signal in the optical domain, the ICS system may allow the receiver to perform direction finding on the signals received via each of the antennas minus the cancelled interference, which may make the estimation of the location of the transmitter more accurate than if the interference cancellation had not been performed. This optical cancellation technique may utilize active cancellation between jammers (e.g., counter-IED jammers) and radio systems to prevent self-interference. The ICS may also be applied to commercial systems suffering from saturated receivers. Optical interference cancellation may allow for processing an extremely wide range of frequencies with minimum distortion. The optical components may allow for multiple orders of magnitude in bandwidth, as well as lower amplitude and phase fluctuation.

For an active interference implementation, the interfering signal may be accurately estimated or sampled in real time. A copy of the clean transmit signal from any jammer or interferer may be obtained using direct coupling or magnetic coupling with an EMI or current probe. In the case of a remote jammer (e.g., the jammer is not directly or physically connected to the ICS), a copy of the jamming signal may be obtained by accurately estimating the jammer signal using a signal received via an antenna (e.g., IEP).

Various architectures may be used for interference cancellation and direction finding depending on the desired level of accuracy, the scenario for which direction/location finding is to be performed, and/or the use case for the direction/location finding application. For example, in some examples direction finding techniques may be applied directly to the signals received via an antenna array while substantially simultaneously performing interference cancellation on the signal of interest to facilitate operable reception of the signals. In other words, RF processing of signals received via the antenna array may be performed in order to determine the relative amplitude and/or phase differences of the overall signals received via the elements of the array (e.g., the phase and amplitude measurements are performed on the signals representing a combination of a component of the signal of interest and the interference signal(s)). The phase and/or amplitude information determined based on the measurements performed on the signals received via the antenna array may then be used to estimate the direction to and/or location of the unknown transmitter. In addition to analyzing the combined interferer plus SOI signals for determining direction finding information (e.g., relative phases, relative amplitudes, relative time of arrival, etc.), the signals received via the antenna array may also be processed by the interference cancellation system in order to determine the signal of interest from the combined interferer plus SOI signal received via the antenna array.

In an example, direction and/or location finding techniques may be applied after a received signal has undergone interference cancellation. For example, rather than performing direction finding directly on the combined interference plus SOI signal(s) received on the different antennas of the array, each of the signals received via the elements of the array may first undergo interference cancellation processing in order to determine the respective SOI components corresponding to that array component. The individual SOI components determined after interference cancellation may then be used to perform the direction finding and/or location finding. Performing direction and/or location finding on the determined SOI components after interference cancellation can result in more accurate direction/location information in some scenarios, but may also result in additional processing complexity as several signal components may be converted to the optical domain for interference cancellation. The interference cancellation parameters applied to each of the signal components in the optical domain (e.g., time delays, attenuations, etc.), may be individually controlled per-signaling component and/or may be jointly controlled using a single signal processing loop.

Figure 3:
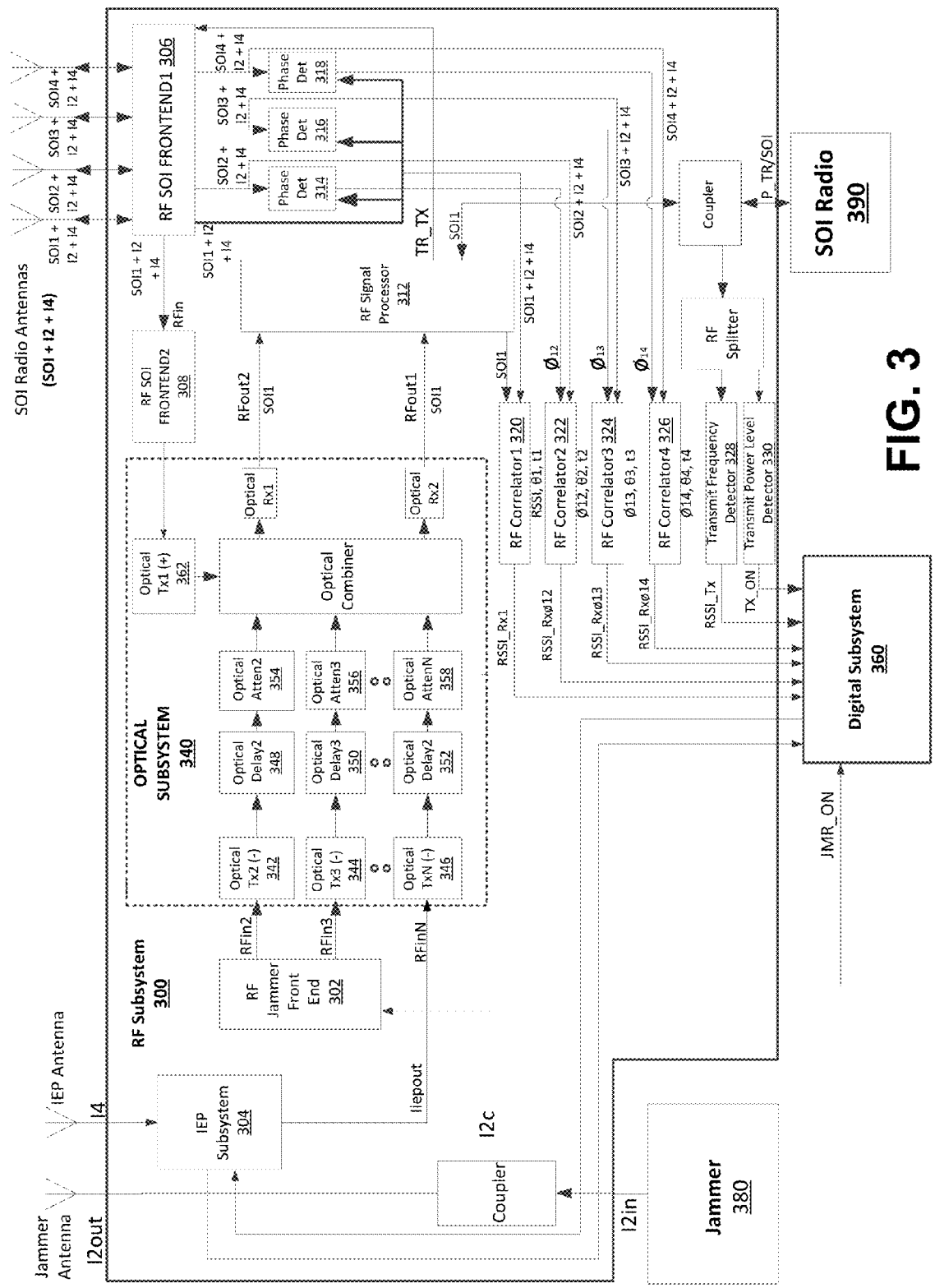
FIG. 3 is a system diagram of an example ICS that may be used to cancel remote and/or local interference from signals received via an antenna array.

FIG. 3 illustrates an example system architecture for performing interference cancellation to determine a signal of interest while substantially simultaneously performing direction finding on the signal of interest. In the example shown in FIG. 3, the SOI may be received via multiple antennas, and in addition to each antenna receiving a component of the SOI, interference components (e.g., I2, I4, etc.) may also be received via the antennas. In the example shown in FIG. 3, the signal received via one of the antennas may be processed via interference cancellation components (e.g., Optical Subsystem 340) in order to determine the SOI, and the signal for which interference cancellation is performed may be designated as a reference signal for performing direction finding. The RF components of RF Subsystem 300 may then determine the relative phases and amplitudes of the signals received via the non-reference elements of the antenna array (e.g., relative to the signal received via the antenna element corresponding to the reference SOI signal) in order to perform direction finding. Interference cancellation to determine the SOI may be performed in parallel to the direction finding processing applied to the signals received via the elements of the array.

As shown in FIG. 3, a Jammer 380 may be operably coupled to the RF Subsystem 300. The signal I2 in may represent an accurate sample of the jammer signal from Jammer 380. In an example, a sample of the interfering signal may be obtained using a current probe that is operably coupled to the Jammer 380 antenna (e.g., Jammer Antenna).

In the example shown in FIG. 3, Jammer 380 may be physically connected to the RF Subsystem 300 in order for the RF Subsystem 300 to obtain a sample or copy of the jammer signal. For example, a coupler may send a sample of the interferer signal (e.g., 12c) to RF Jammer Front End 302. RF Jammer Front End 302 may include a variable attenuator, a low noise amplifier, a fixed RF bandpass filter, and/or tunable RF filter. The variable attenuator, a low noise amplifier, a fixed RF bandpass filter, and/or tunable RF filter of RF Jammer Front End 302 may be configured to filter the jammer signal prior to processing by the Optical Subsystem 340. For example, RF Jammer Front End 302 may be configured to prevent the generation of additional harmonics and/or intermods of the Jammer 380 signal within the ICS. Similarly, IEP Subsystem 304 may be used to estimate interference signal I4 caused by a remote interferer radio. The estimated interferer signal may be represented by Iiepout.

RF Jammer Front End 302 may be configured to detect when either Jammer 380 and/or a remote interferer being monitored by EIP Subsystem 304 is in operation and/or may be interfering with signals received for SOI Radio 390 (although Jammer 380 is shown in FIG. 3, the remote interferer is not shown in FIG. 3). When either Jammer 380 is in operation and/or when interference is being detected from a remote interferer, RF Jammer Front End 302 may send signal JMR_ON to the Digital/Control Subsystem 360. The ICS may be configured to determine to begin interference cancellation based on the concurrent detection of interference transmission and lack of transmission from/by transceiver for SOI Radio 390. RF Jammer Front End 302 may be configured to automatically detect when either of the interferers begins transmission. RF Jammer Front End 302 may include an RF detector and a comparator. The comparator may be used to set the threshold that is used to determine whether either of the interferers are operating, for example based on the detected interferer power exceeding a predetermined threshold RF Jammer Front End 302 may send the signal JMR_ON to the Digital/Control Subsystem 360 when Jammer 380 is on and is transmitting via the Jammer Antenna and/or when a signal is detected by IEP subsystem 304. Digital/Control Subsystem 360 may be configured to determine whether to perform interference cancellation based on the JMR_ON signal from RF Jammer Front End 302.

RF Jammer Front End 302 may send a copy of the interference signal (e.g., 12c) from Jammer 380 to the Optical Subsystem 340 in order to aid in the cancellation of the Jammer 380 signal from the signals that are received via the SOI Radio Antennas. For example, RF Jammer Front End 302 may send one or more copies of the interference signal from Jammer 380 (e.g., RF_in 2, RFin3, etc.) to optical transmitters (e.g., Optical Tx2 (−) 342, Optical Tx3 (−) 344) for conversion to the optical domain. The jammer signal may be phase shifted by 180° during the conversion to the optical domain. The shifted optical signal may be referred to as an optically inverted jammer signal. Similarly, an estimated sample of the remote interference signal, I4, may be supplied to Optical Subsystem 340 (e.g., RFinN) in order to cancel the remote interference signal in order to determine the SOI. The remote interferer signal may be converted to the optical domain and phase shifted by 180° by an optical transmitter (e.g., Optical TxN (−) 346). Operation of the Optical Subsystem 340 to perform interference cancellation will be described in more detail below.

In the example shown in FIG. 3, each element of the SOI radio antenna array may receive a respective component of the SOI. For example, if there are four elements in the array, a first antenna element may receive signal component SOI1, a second antenna element may receive signal component SOI2, a third antenna element may receive signal component SOI3, and a fourth antenna element may receive signal component SOI4. Although each of SOI1, SOI2, SOI3, and SOI4 may be substantially similar signals, due to the different transmission paths between the array elements and the transmitter of the SOI, the phase and/or amplitudes of the SOI signal components may vary depending on which array element the signal component corresponds to and the relative location of the SOI transmitter with respect to the array.

Additionally, the elements of the antenna array may receive interference components in addition to SOI components. For example, each element of the array may receive signal components corresponding to Jammer 380 (e.g., I2) and corresponding to a remote interferer (e.g., I4). For example, the overall signal received via a first element of the array may be expressed as (SOI1+I2+I4). In this example, this array element and the corresponding signal received via the array element may be designated as a reference signal for performing interference cancellation and/or direction finding. The signals received via the other elements for the array may be represented as the sum of a respective SOI component and interference component(s). For example, if the reference signal is expressed as (SOI1+I2+I4), the signals received via the other array elements may be expressed as (SOI2+I2+I4), (SOI3+I2+I4 ), and (SOI4+I2+I4).

Interference cancellation may be performed on the reference signal in order to determine the relevant information from the signal of interest. For example, if the signal (SOI+I2+I4) represents the reference signal, then interference cancellation of the signal components I2 and I4 in order to determine SOI1 pre-processed by RF SOI Frontend 1 306 and RF SOI Frontend 308 prior to being converted to the optical domain by Optical Subsystem 340. The RF pre-processing of the reference signal may be performed in order to prevent the reference signal from being distorted due to measurements and/or conversion to the optical domain. The reference signal may be converted to the optical domain by an optical transmitter (e.g., Optical Tx1 (+) 362). Optical Subsystem 340 may then be controlled by Digital Subsystem 360 to cancel the jammer (e.g., I2) and remote (e.g., I4) signals from the reference signal (e.g., SOI1 +I2+I4). The cancellation may be performed by variably altering the attenuation level(s) (e.g., using Optical Attenuator2 354, Optical Attenuator3 356, Optical AttenuatorN 358) and/or time delay(s) (e.g., using Optical Delay Line2 348, Optical Delay Line3 350, Optical Delay LineN 352) of the optically inverted inference signals while monitoring the output of the resulting signal output from Optical Subsystem 340. The delay lines and/or attenuation levels applied to the optically inverted interference signals may be varied in order to minimize the power level of the resultant output of Optical Subsystem 340 after conversion back to the RF domain. The attenuated and/or time delayed optically inverted interference signals may then be combined with the optical version of the reference signal (e.g., SOI1+I2+I4), resulting in the cancellation of the I2 and I4 interference signals. For example, when the power level of the output of the Optical Subsystem (e.g., after conversion back to the RF domain) is minimized, the Digital Subsystem 360 may determine the a maximum level of interference cancellation has been achieved, as the majority of the power level corresponding to the received reference signal may be assumed to be attributable to the interference sources.

After applying appropriate time delays and/or attenuations to the optically inverted interference signals and combining the optically inverted interference signals with the reference signal, the result may be an optical version of the SOI signal component SOI1, SOI may be converted back to the RF domain (e.g., using a photodiode detector) and may be post-processed by RF Signal Processor 312. RF Signal Processor 312 may be configured to process the output of Optical Subsystem 340 with minimal effect on SOI1, For example, when Optical Subsystem 340 acts to cancel the interferer signal to obtain a clean version of SOI1, Optical Subsystem 340 may introduce noise and/or attenuate the signal of interest during the interference cancellation process. In order to provide additional gain to SOI after cancellation, RF Signal Processor 312 may be applied to the output of Optical Subsystem 340. For example, RF Signal Processor 312 may have low noise amplifier(s) to increase the power level of SOI without further accentuating the noise that may have been introduced to the signal. In an example, RF Signal Processor 312 (e.g., and/or one or more of the receive RF front-end components or the jammer RF front-end components) may be configured to be linear devices in order to avoid introducing distortion to the signal of interest. The resulting SOI signal may then be provided to SOI Radio 390 for operable processing.

In addition to cancelling the interferer signals from the reference signal in order to provide SOI Radio 390 with a "clean" (e.g., relatively free of interference) version of the SOI (e.g., SOI1), RF processing may be performed on the reference signal and the signals received via the other antenna array elements in order to perform direction finding. For example, the non-reference signals received via the SOI Radio Antennas may be pre-processed by RF SOI Frontend1 306 prior to being applied directly to a series of phase detectors (e.g., Phase Detector 314, Phase Detector 316, and Phase Detector 316, respectively). In this example, the reference signal received via the first SOI antenna (e.g., the signal SOI1+I2+I4) may be compared to the signals received over the other antennas in order to determine the relative phase differences of the signals received on the other antennas as compared to the reference signal.

For example, the phase detectors may mix the three non-reference signals received via the SOI Radio Antennas with the main reference signal (e.g., SOI1+I2+I4) for detection of the relative phases Ø12, Ø13, and Ø14 between the main reference signal and the each of the three non-reference signals received via the other elements of the antenna array. Ø12 may represent the phase difference between the reference signal and the signal received via antenna element 2, Ø13 may represent the phase difference between the reference signal and the signal received via antenna element 3, and Ø14 may represent the phase difference between the reference signal and the signal received via antenna element 4. Each of the phase detectors (e.g., Phase Detector 314, Phase Detector 316, Phase Detector 318) may provide two signals to a respective RF correlator/detector (e.g., RF Correlator2 322, RF Correlator3 324, RF Correlator4 326) in order for the Digital Subsystem 360 to determine the relative amplitude and phase differences corresponding to the signals received via the different antenna elements. For example, each phase detector may provide a corresponding RF correlator with an indication of the phase different between the reference signal and the signal received via the non-reference antenna element (e.g., in the case of the second antenna element Phase Detector 314 may output an indication of phases Ø12). Additionally, each RF correlator may also be provided with a copy of the RF signal corresponding to that array element (e.g., RF Correlator 322 may be provided with phases Ø12 from Phase Detector 314 and a copy of signal (SOI2+I2+I4) from RF SOI Frontend 1 306). The non-reference signal(s) provided to the RF correlators (e.g., (SOI2+I2 +I4), (SOI3+I2+I4), (SOI4+I2+I4), etc.) may represent the amplitude of the signal via an antenna and may be expressed in dBm or Milliwatts or Watts.

The phase detectors and RF correlators may be implemented using RF mixers. For example, in the RF and Microwave systems, RF mixers can be used to perform measurements and/or comparisons of phase information. Phase Detector 314, Phase Detector 316, and Phase Detector 381 may be implemented using a double balanced mixer (e.g., four-diode ring mixer) in order to output the phase difference between the reference signal and the non-reference signal(s). The phase measurement of a non-reference signal and the reference signal may be proportional to the DC output of the phase detector. For example, since the signals received over the antennas of the antenna array and applied to the input ports of the mixer may have near identical constant amplitude at the frequencies of interest, the resulting DC output at the output port of the mixer/phase detector may be proportional to the phase difference of the two signals. Such relationship may be used to perform the phase measurement in RF domain by choosing the appropriate type of mixers for the phase detector depending on the frequency of the SOI. The DC output value in millivolts or Volts indicates the corresponding value of the phase differences (e.g., Ø12, Ø13, Ø14) between signals received via the different antenna elements.

Ø12, Ø13, and Ø14 may be sent to RF Correlator2 320, RF Correlator3 322, and RF Correlator4 324 inputs, respectively. The RF correlators may also be implemented using mixers. For example, the RF correlators may be implemented as an RF mixer-based correlator, such that the digital signal processing on the output of the correlators can be performed by Digital Subsystem 360. The RF correlator/detectors may have a relatively high dynamic range and sensitive receiver, for example using low noise amplifiers (LNAs), double down-conversion mixers, RF SAW bandpass filters, RF power detectors or logarithmic amplifiers, and analog to digital converters (ADCs). The LNAs may improve the sensitivity of the receiver, the RF SAW filters pre-process the signals for the corresponding receiver bandwidth, while the mixers may provide the appropriate low frequency signal(s) for the output of the correlator/detector for easy digital signal processing in Digital Subsystem 360. If required, the analog output signal of the correlator/detector can be converted to a digital signal before it is applied to the input of the Digital Subsystem 360 for processing.

Thus, the RF correlators may receive amplitude (e.g., corresponding to the indication of the non-reference signal; (SOI2+I2+I4), (SOI3+I2+I4), (SOI4+I2+I 4), etc.) information and phase (e.g., corresponding to the phase differences Ø12, Ø13, Ø14 , etc.) information for a respective antenna array element. The correlators may use this information to generate a received signal strength indicator (RSSI) for each of the non-reference array elements. The resulting RSSI outputs from the RF correlators (e.g., RSSI_RxØ12, RSSI_RxØ13, RSSI_RxØ14) may represent a measurement of the power present in a received radio signal at baseband frequency after signal processing in the RF receiver front-end. The RSSI is usually measured in units of dBm, Milliwatts, or Millivolts. The output of the RF correlators may represent the relative strength or reception level of the different SOI components received via the different antenna elements.

Since in this example (SOI1+I2+I4) is being used as a reference signal, the RSSI measurement for the reference antenna element may be performed after the interference signals have been removed from the reference signal in the optical domain. For example, RF Signal Processor 312 may send the filtered SOI1 and residual interference signal to RF Correlator 320. RF Correlator 320 may send an RF correlator output signal (e.g., RSSI_Rx1) to Digital Subsystem 360. The RF Correlator 320 output signal may be used by Digital Subsystem 360 to control the amplitude of one or more variable attenuators (e.g., RF variable attenuators and/or optical variable attenuators of Optical Subsystem 340) and/or time delay and/or phase of variable time delay units (e.g., time delay units of Optical Subsystem 340). The signal RSSI_Rx1 may be a received signal strength indication (RSSI) of any resultant interference signal as detected by RF Correlator 320 (e.g., plus the SOI). For example, the signal RSSI_Rx1 may be considered a measure of the cancellation depth of the ICS. For example, when RSSI_Rx1 is minimized, the cancellation depth of the ICS may be considered to be maximized (e.g., the cancellation of the jammer and remote interferer signals may be maximized). When RSSI_Rx1 is high or maximized, the cancellation depth of the ICS may be considered to be minimal (e.g., the jammer and/or remote interferer signal may be essentially uncancelled). Thus, the signal RSSI_Rx1 may be considered a measure of the dynamic range of the ICS.

In an example, RF Correlator 320 may include one or more mixers with integrated synthesizers, fixed RF attenuators, bandpass filters, and/or LogAmps. The output signal RSSI_Rx1 may be measured continually during cancellation to determine the residual content of the cancelled jammer signal. If the signal RSSI_Rx1 is minimized, Digital Subsystem 360 may determine that the cancellation of the jammer has been maximized for the antenna component used to receive SOI1+I2+I4. When a cancellation threshold for RSSI_Rx is detected by Digital Subsystem 360 (e.g., the power level of RSSI_Rx1 falls below a threshold), Digital Subsystem 380 may control the RF circuitry to send the clean SOI1 signal to SOI Radio 390 for signal processing and reception.

Digital Subsystem 360 may be configured to implement a control loop that utilizes the output of RF Correlator 320 as feedback for determining appropriate value for the attenuator gains and/or time delays of Optical Subsystem 340 and/or for the attenuation gains of one of more RF variable attenuators. These parameters may be stepped and/or varied in order to minimize RF Correlator 320 output. Since the SOI signal component may be associated with power levels that are orders of magnitude smaller than that of the jammer and/or remote interferer signals, the received SOI1 may be on the order of −60 dBm or lower. Since RF Correlator 320 output RSSI_Rx1 may be considered a measure of RF power at the frequency of the SOI1, reductions in the power level of RF Correlator/Detector 338 output may be mainly due to the cancellation of the interference signal(s) from the combined SOI1+I2+I4 signal.

Although the ICS interfaces with SOI Radio 390 that is used to transmit and/or receive SOIs, the transmit output power and transmit frequency of SOI Radio 390 may be unknown to the ICS. For example, the ICS may be configured to be attached to wide range of radio types (e.g., utilizing different frequencies and/or bandwidths), and thus the ICS may be configured to determine the frequency of operation for a given SOI Radio 390 and/or to determine when SOI Radio 390 is in transmitting mode. For example, Transmit Power Level Detector 330 may be configured to measure the transmit power of Radio Transceiver 308 and Transmit Frequency Detector 328 may be configured to determine the frequencies of the SOI for SOI Radio 390.

Thus, the RF Correlators of RF Subsystem 300 (e.g., RF Correlator1 320, RF Correlator2 322, RF Correlator3 324, RF Correlator4 326) may provide Digital Subsystem 360 with a series of RSSI measurements corresponding to the relative phase differences between the signals. For example, RSSI_Rx 1 may represent the amount of interference cancellation achieved in order to determine a "clean" version of SOI via the Optical Subsystem, and each of RSSI_RxØ12, RSSI_RxØ13, and RSSI_RxØ14 may correspond to a power level that indicates the relative phase difference between a non-reference signal (e.g., (SOI2+I2+I4), (SOI2 +I2+I4), and (SOI2+I2+I4), respectively) and the reference signal (e.g., SOI1+I2+I4). These relative phase differences are used by Digital Subsystem 360 in order to perform location determinations.

Similarly, in addition to determining the relative phase differences at the frequency of the SOI for each element of the array, the Phase-Of-Arrival ($\theta 1$, $\theta 2$, $\theta 3$, $\theta 4$) and/or relative Time-Of-Arrival (t2−t1, t3−t1, t4−t1) may be determined for the different array elements. For example, t1 may be the Time-Of-Arrival for the signal (SOI1+I2+I4), t2 may be the TOA for (SOI2+I2+I4), t3 may be the TOA for (SOI3+I2+I4), and t4 may be the TOA for (SOI4+I2+I4). Similarly, Ø1 may represent the phase of arrival of signal (SOI1 +I2 +I4), $\theta 2$ may represent the phase of arrival of signal (SOI2+I2+I4), $\theta 3$ may represent the phase of arrival of signal (SOI3+I2+I4), and $\theta 4$ may represent the phase of arrival of signal (SOI4+I2+I4). RF correlators may be used to generate analog signals representing each the relative times of arrival (e.g., t1, t2, t3, t4; t2−t1, t3−t1, t4−t1; etc.) and phases of arrival (e.g., $\theta 1$, $\theta 2$, $\theta 3$, $\theta 4$) for the different array elements such that the information may be communicated to Digital Subsystem 360 for direction finding and/or location determining.

In some practical realizations, the four or more antenna elements may receive essentially the same signals except for the corresponding Phase-Of-Arrival and relative Time-Of-Arrival. The received signals may be assumed to be almost equal in amplitude, therefore any one of the 4 (or N) signals may be chosen as the main reference received signal. In practice the signal levels of the interferers I2 and I4 may be magnitudes larger than the SOI.

In the example illustrated in FIG. 3, a "clean" version of the SOI (e.g., a clean version of SOI1) is determined from the signal received via one of the antenna elements (e.g., signal (SOI1+I2+I4) by cancelling the interference in the optical domain. Although the interference is cancelled from SOI1 in order for SOI1 to be properly received by SOI Radio 390, the parameters used by the Digital Subsystem 360 for performing direction finding and/or determining location (e.g., relative phase between signals received via the antenna elements, relative time of arrival between the signals, phase of arrival of the signals, etc.) may be generated based on the combined interference plus SOI signal as received on the different elements of the array. In these examples, interference cancellation may be performed for the antenna array signal that is designated to be the reference signal, but not for the signals received via the other array elements. However, in some examples the interference may be removed from the signals received via each of the array elements prior to performing location and/or direction finding.

Figure 4:
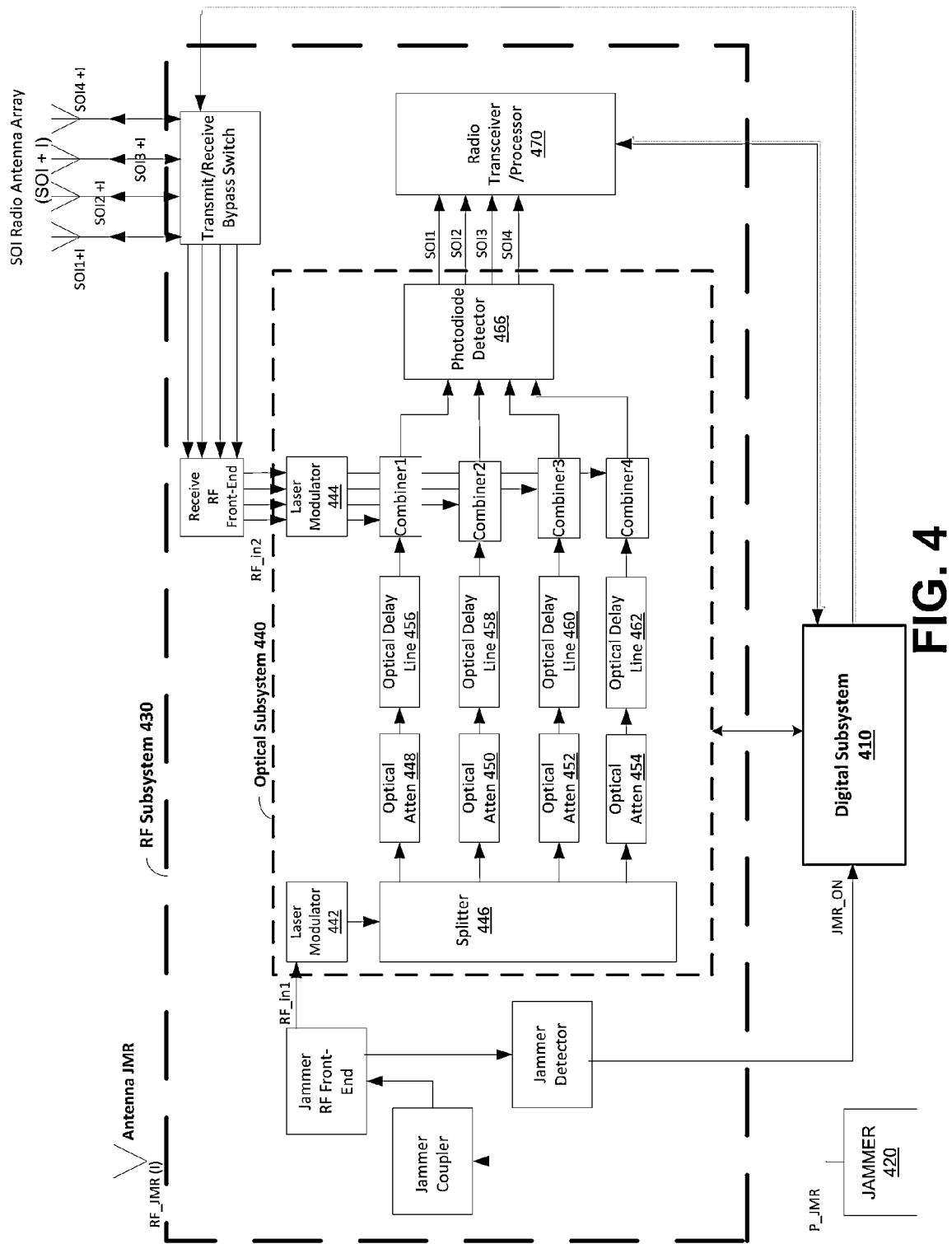
FIG. 4 is a system diagram of an example architecture serially cancelling interference from each of the signals associated with elements of an antenna array.

FIG. 4 illustrates an example architecture for performing serial interference cancellation for signals received via multiple antennas. Although a single source of interference is shown in FIG. 4 (e.g., Jammer 420), the methods and systems described may be equally applicable to an estimated remote interferer signal and/or multiple sources of interference. In the example shown in FIG. 4, coherent optical interference cancellation techniques may be applied to each signal received via an antenna of the SOI Radio Antenna Array. The attenuation levels and/or time delays applied by Optical Subsystem 440 may be applied on a per-antenna element basis (e.g., the attenuation and/or time delays are specific to a signal of a specific antenna element) or may be common to each of the array elements or a subset thereof (e.g., the same attenuation levels and/or time delays are applied for each signals corresponding to an array element). Additionally, although the architecture of FIG. 4 shows each of the SOI+I signals being received via a distinct antenna element, a similar architecture may be applied to cancel interference that is affecting multiple signals that may be received by the same or different antennas. For example, SOI1, SOI2, SOI3, and SOI4 may represent GPS signals received from different GPS satellites. Although each of the GPS SOI signals may be received over the same or different antennas, a serial interference cancellation approach may be applied to each of the signals in order to determine the position of the device receiving the GSP SOI signals.

In an example, there may be four antenna elements in the SIO Radio Antenna Array. For example, Antenna1 may receive SOI component SOI1, Antenna2 may receive SOI component SOI2, Antenna3 may receive SOI component SOI3, and Antenna4 may receive SOI component SOI4. In addition to the SOI components, each antenna may also receive interference signal I. As a result, the combined signal received via each of Antenna1, Antenna2, Antenna3, and Antenna4 may be expressed as SOI1+I, SOI2+I, SOI3+I, and SOI4+I, respectively. In order to determine each of SOI1, SOI2, SOI3, and SOI4 from the combined SOI1+I, SOI2+I, SOI3+I, and SOI4+I signals, the received signals and a copy of the interference signal may be converted to the optical domain for coherent interference cancellation.

For example, the RF to Optical conversion may be realized using laser modulators. For example, two or more matched laser modulators (e.g., Laser Modulator 442 and Laser Modulator 444) may be utilized for a coherent optical cancellation approach. The input to Laser Modulator 442 may be RF_in 1, which may represent the interference signal that is affecting the SOIs received via the SOI Radio Antenna Array (e.g., Signal I). In addition to converting a sample of the interference signal to the optical domain, Laser Modulator 442 may additionally introduce a −180° phase shift to the optically converted version of the interferer signal. The phase shifter may be implemented as part of Laser Modulator 442 or may be a separate component. An optical signal that is optically phase shifted by −180 degrees that is combined with an unshifted version of the same optical signal may result in complete destructive interference/complete cancellation if the phase shift is ideal. Phase shifting in the optical domain may achieve near ideal results across a wide frequency range.

The input to Laser Modulator 444 may be represented as RF_in2, which may represent the combined signals of interest plus interferer signals that are received over the SOI Radio Antenna Array. For example, if there are four antennas in the array, RF_in2 may be expressed as the four signals SOI1+I, SOI2+I, SOI3+I, and SOI4+I. SOI1, SOI2, SOI3, and SOI4 may represent any four signals for which interference cancellation is desired, such as SOI components received from different antenna elements of an antenna array or GPS signals received from different GPS satellites. Laser Modulator 444 may convert each of the signals from the RF to optical domain.

Each of the combined SOI plus interferer signals may be processed separately by Optical Subsystem 440 when performing coherent optical interference cancellation. For example, a first optical cancellation path including Optical Attenuator 448 and Optical Delay Line 456 may be implemented for cancelling interference signal I from the signal SOI1+I in order to determine SOI1 (e.g., be utilized to cancel the interference signal from the signal received via Radio Antenna 1). Similarly, a second optical cancellation path including Optical Attenuator 450 and Optical Delay Line 458 may be utilized to cancel the interference signal I from the signal SOI2+I (e.g., received via Radio Antenna 2), a third optical cancellation path including Optical Attenuator 452 and Optical Delay Line 460 may be utilized to cancel the interference signal I from the signal SOI3+I (e.g., received via Radio Antenna 3), and a fourth optical cancellation path including Optical Attenuator 454 and Optical Delay Line 462 may be utilized to cancel the interference signal I from the signal SOI4+I (e.g., received via Radio Antenna 2).

In an example, it may be assumed that the interference signal I is the same for each antenna array element. This may be an appropriate assumption if the receive antennas are relatively close together and the channel between the source of the interference (e.g., Antenna JMR) and each of the elements of SOI Radio Antenna Array is similar. If the interference signal is assumed to be the same for each of the SOIs, then the interference may be cancelled in the optical domain using the same optical attenuation and/or delay line parameters for each of the paths. In other words, each of Optical Attenuator 448, Optical Attenuator 450, Optical Attenuator 452, and Optical Attenuator 454 may apply the same level of attenuation to respective copies of optically inverted interference signal and/or each of Optical Delay Line 456, Optical Delay Line 458, Optical Delay Line 460, and Optical Delay Line 462 may apply the same amount of time delay to the optically inverted interferer signal prior to being combined with the optical version of a respective SOI plus interferer signal.

If the interference signal is not assumed to be the same for the respective SOIs, the individualized optical attenuation parameters and/or delay line parameters may be different for each SOI component. For example, the attenuation performed by Optical Attenuator 448 in order to determine SOI1 from SOI1+I may be different than the attenuation level applied at of Optical Attenuator 450 for determining SOI2 from SOI2+I (e.g., which may be different than that of Optical Attenuator 452, which may be different than that of Optical Attenuator 454, etc). Similarly, the time delay added by Optical Delay Line 456 in order to determine SOI from SOI1+I may be different than the time delay applied at of Optical Delay Line 458 for determining SOI2 from SOI2+I (e.g., which may be different than that of Optical Delay Line 460, which may be different than that of Optical Delay Line 462, etc).

Digital Subsystem 410 may control the optical attenuators (e.g., Optical Attenuator 448, Optical Attenuator 450, Optical Attenuator 452, and Optical Attenuator 454) and/or optical delay lines (e.g., Optical Delay Line 456, Optical Delay Line 458, Optical Delay Line 460, and Optical Delay Line 462) either individually (e.g., a different interference signal may be present on each line) or in unison (e.g., the same interference signal may be assumed to be present on each line). The control may be based on feedback received from the signals output from the Optical Subsystem 440. For example, each of the optical versions of SOI1+I, SOI2+I, SOI3+I, and SOI4+I output from Laser Modulator 444 may be combined with an appropriately attenuated and time delayed version of the optically inverted interference signal. If proper values for the attenuation and delay are selected for each line, then the Interferer signal (I) can be near perfectly cancelled from the optical versions of the SOI1+I signals. The resultant signals can be converted back to the RF domain using Photodiode Detector 466 for post cancellation processing/reception by Radio Transceiver/Processor 470. The resultant output signals SOI1, SOI2, SOI3, and SOI4 may be monitored by Digital Subsystem 410 in order to determine whether a requisite amount of interference cancellation has been achieved.

For example, Digital Subsystem 410 may attempt to minimize an output power of each of the lines, and a maximum power level reduction may correspond to a maximum level of interference cancellation. The Digital Subsystem may monitor the output power levels for each of the antenna lines for Radio 1 and may control the attenuation and/or delay line parameters for each line based on the individualized power level.

In an example, the optical transmitters/laser modulators may utilize a counter phase Mach-Zehnder modulator (MZM) in order to convert the RF signals to optical signals. In another example, the optical transmitters/laser modulators may utilize direct modulation from RF to optical.

In an example, once the interference sample is converted to an optical signal using Laser Modulator 442, a length of optical cable may provide the optically inverted interferer sample to one or more tapped delay lines with a delay that is very close to the antenna coupling delay. The delay associated with the one or more optical delay lines may be controlled and/or varied by the Digital Subsystem 410. By ensuring that the delay is close to that of the antenna coupling delay, dispersion for broadband cancellation may be minimized and RF isolation may be achieved.

In order to perform the cancellation over each of signals corresponding to the different SOI components, the optical signal corresponding to interferer output may be split using Splitter 446 and may be processed using the variable optical attenuators (e.g., Optical Attenuator 448, Optical Attenuator 450, Optical Attenuator 452, and Optical Attenuator 454, etc.) and delay lines for weighting networks (e.g., Optical Delay Line 456, Optical Delay Line 458, Optical Delay Line 460, and Optical Delay Line 462, etc.) individually for each of the antenna signals. Thus, each of the antenna array signals may be combined with an individually phase shifted and delayed optically inverted interference signal for interference cancellation. If the interference is assumed to be the same for each of the antennas in the array, the attenuation and the delay may be the same on each of the lines. If the interference affects the signals on the optical transmission lines differently (e.g., some antennas may be more interfered with than others), the attenuation and/or delay may be controlled on a per line basis.

Control signals that control the operation of the components of the Optical Subsystem 440 (e.g., optical attenuators and optical delay lines) may be provided from the Digital Subsystem 410. For example, when the cancellation of the interference signal from the SOI+I signals in the optical domain does not achieve a desired depth of interference cancellation, there may be one or more residual interference signal(s) present at the output of Photodiode Detector 466. The SOI signals and the residual interferer signals for each of the antennas in the array at the output of the Photodiode Detector 466 after cancellation in the Optical Subsystem 440 may be processed and filtered using an RF Signal Processor 470 prior to being sent to an RF Correlator/Detector (e.g., an RF Power Meter). RF Signal Processor 470 may include an RF filter, low noise amplifier (LNA), and/or coupler depending on the application of the ICS. RF Signal Processor 470 may be configured to process the output of the Photodiode detector 466 with minimal effect on the SOI signals. For example, when the Optical Subsystem 440 acts to cancel the interferer, the Optical Subsystem 440 may introduce noise and/or attenuate the signal of interest during the interference cancellation process.

In order to provide additional gain to the SOI signals after cancellation, RF Signal Processor 470 may be applied to the output of the Optical Subsystem 440. For example, RF Signal Processor 470 may utilize an LNA to increase the power level of the SOI signals without further accentuating the noise that may have been introduced to the signal. In an example, RF Signal Processor 470 may be configured to be linear devices in order to avoid introducing distortion to the signals of interest.

The RF Signal Processor may send the filtered SOI and residual interference signal to a series of RF Correlator/Detectors (not shown in FIG. 4). The RF Correlator/Detectors may send an RF correlator output signal (e.g., RSSI_Rx) to Digital Subsystem 410. The RF correlator output signal may be used by the Digital Subsystem to control the amplitude and/or phase of the optical weighting network of the Optical Subsystem (e.g., the attenuation levels and or timed delay levels). When referred to herein, the term weighting network of the Optical Subsystem may refer to variable optical attenuators and/or delay lines in the Optical subsystem. The RSSI_Rx may be determined on a per Radio Antenna basis (e.g., individually for SOI 1, SOI2, SOI3, SOI4, etc.). In this way, the amount of cancellation may be varied for each of the lines individually. In an example, if the interference signal is assumed to be the same on each of the signals for the antennas of the antenna array, then a single line or a combination of the lines may be used to determine RSSI_Rx.

The signal RSSI_Rx may be a received signal strength indication (RSSI) of any resultant interference signal as detected by the RF Correlator/Detector. For example, the signal RSSI_Rx may be considered a measure of the cancellation depth of the ICS. For example, when RSSI_Rx is minimized, the cancellation depth of the ICS may be considered to be maximized (e.g., the cancellation of the interferer signal I may be maximized). For example, the signal RSSI_Rx may be considered a measure of the dynamic range of the ICS.

In an example, the RF Correlator/Detectors may include mixers with integrated synthesizers, fixed RF attenuators, bandpass filters, and/or LogAmps. The output signal RSSI_Rx1 may represent the output power level of the SOI signal plus any residential interference that was not cancelled by Optical Subsystem 440. The output signal RSSI_Rx2 may represent the output power level of the SOI2 signal plus any residential interference that was not cancelled by Optical Subsystem 440. The output signal RSSI_Rx3 may represent the output power level of the SOI3 signal plus any residential interference that was not cancelled by Optical Subsystem 440. The output signal RSSI_Rx4 may represent the output power level of the SOI4 signal plus any residential interference that was not cancelled by Optical Subsystem 440. Each of RSSI_Rx1, RSSI_Rx2, RSSI_Rx3, and RSSI_Rx4 may be measured continually during cancellation to determine the residual content of the cancelled interference signals. If the signal(s) RSSI_Rx# are minimized, Digital Subsystem may determine that the cancellation of the interferer has been maximized. When the correct threshold is detected by the Digital Subsystem 410, the clean SOI signals (e.g., SOI1, SOI2, SOI3, and SOI4) may be used for the triangulation and/or trilateration determination in order to determine a position of the receiver and/or transmitter of the SOI. For example, direction finding techniques may be performed on each of the antenna array lines (e.g., SOI1, SOI2, SOI3, SOI4), and the result may be used to determine the position of the SOI radio if the location of the SOI transmitter(s) is/are known. If the location of the receiver is known, than a direction or location of the SOI transmitter can be estimated using SOI1, SOI2, SOI3, and SOI4.

Digital Subsystem 410 may be configured to implement a control loop that uses the power levels of the signal output from Optical Subsystem 440 after conversion back to RF such that the gains and/or delays of the optical weighting network are varied in order to minimize the correlator/RF power meter output. A zero correlator output/minimized correlator output may indicate a complete cancellation of the interference signal. This may be the case because the SOI signals may be orders of magnitude smaller than the jammer signal. Since the correlator output may be considered a measure of RF power at the frequency of the SOI signals, reductions in the power level of the correlator output may be mainly due to the cancellation of the interference signal from the combined interference plus SOI signals received via the antenna array.

As an example, a first antenna element may be configured to receive SOI1+I. The SOI1+I signal may be converted to the optical domain and combined with a variably attenuated and variably time delayed version of an optical copy of the interferer signal (I) that has been phase shifted by 180 degrees. The resultant signal may be converted back to the RF domain and the RF power level of the resultant signal may be determined. The digital subsystem may vary the level of attenuation and/or time delay in order to minimize the power level of the resultant signal. When a minimum power level is achieved, the resultant signal may be assumed to effectively be SOI1, Similar techniques may be applied to each of SOI2, SOI3, and SOI4. The digital subsystem may vary the attenuation and time delays applied in the optical subsystem on a per-SOI component basis, for example based on the output power level from the Optical Subsystem for that respective SOI component.

The Digital/Control Subsystem may be configured to automatically allocate multiple optical cancellation paths per interference cancellation. For example, a single optical cancellation path may cancel interferers present at the radio transceiver antenna within a 100 MHz bandwidth. A second path may be used to cancel a second interferer. Such an example is illustrated in FIG. 3, where two optical weighting paths may be used to cancel the coupled interferer while a third path may be used to cancel the remote interferer. In an example, the second optical path used for a single interferer signal may be utilized in order to cancel the second multipath signal of the interferer. Each optical path may be independently controlled (e.g., each weighting network may be independently controlled).

In an example, once the interference has been cancelled from the signals received via the various antennas, triangulation and/or trilateration measurement parameters may be determined in order to perform a location estimation of the transmitter, for example if the position of the SOI receiver is known. Similarly, if the position(s) of the SOI transmitter(s) are known, a location of the SOI receiver can be estimated based on the SOI components SOI1, SOI2, SOI3, and SOI4.

Location estimation may be determined based on an elevation AOA (which may be expressed as θ), a TOA, and/or angle of deviation or azimuth (which may be expressed as Ø) in a three dimensional space. For example, a procedure such as Multiple Signal Classification (MUSIC) may be used to estimate signal parameters. The estimate may include a number of incident signals and their respective direction of arrival (DOA).

Figure 5:
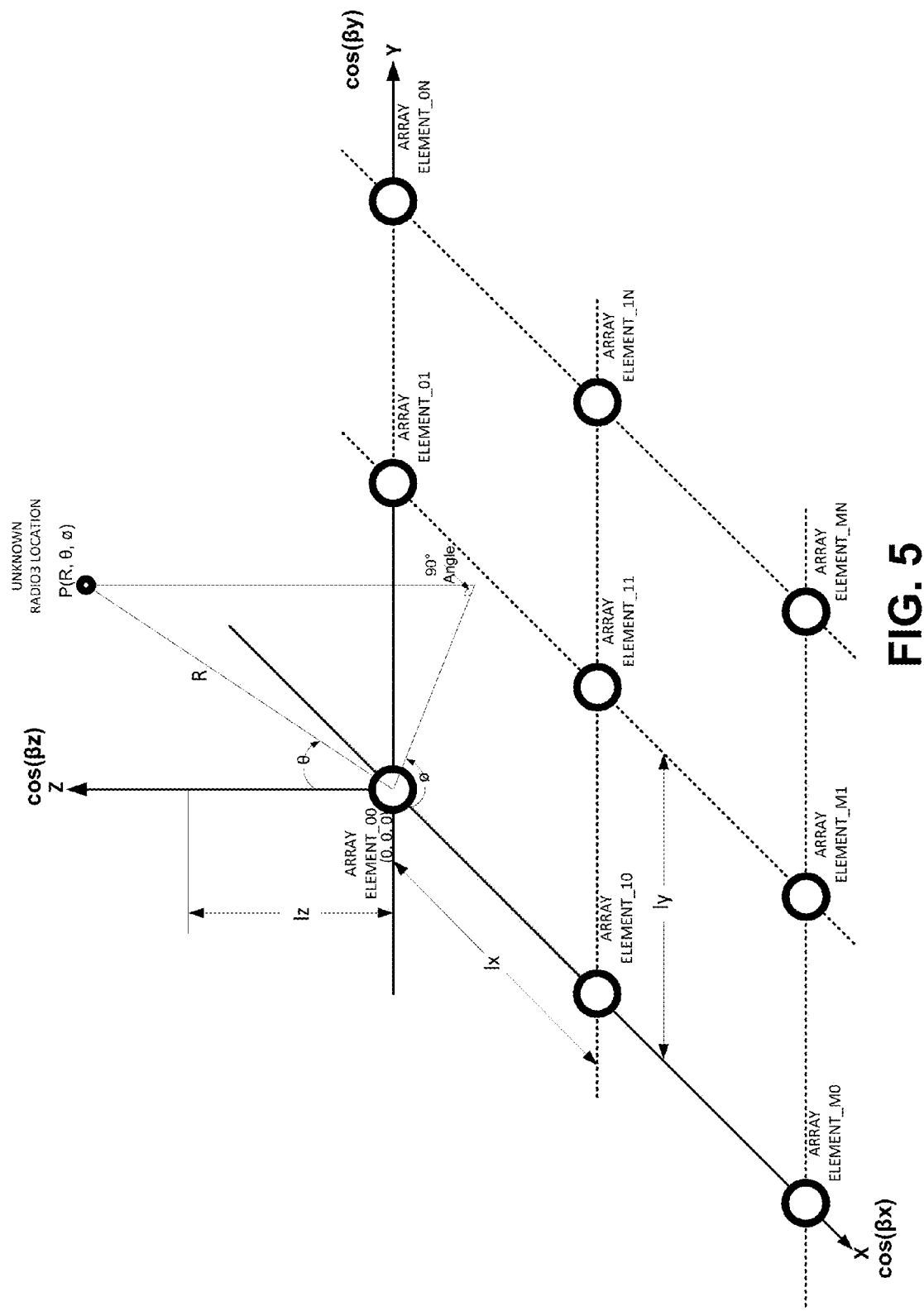
FIG. 5 illustrates an example rectangular antenna array architecture.

For the measurement of parameters, a planar antenna array of four elements forming a rectangular grid may be utilized. The elements may be equidistant from each other and/or may be arranged in space with three dimensional coordinates. More array elements may be used in some examples. As an example that utilizes four array elements (e.g., expressed as ELEMENT_00, ELEMENT_10, ELEMENT_11 and ELEMENT_01), FIG. 5 illustrates an example four-element, rectangular antenna array that may be used to determine the location of an unknown radio based on measurement parameters determined after interference cancellation.

Figure 6:
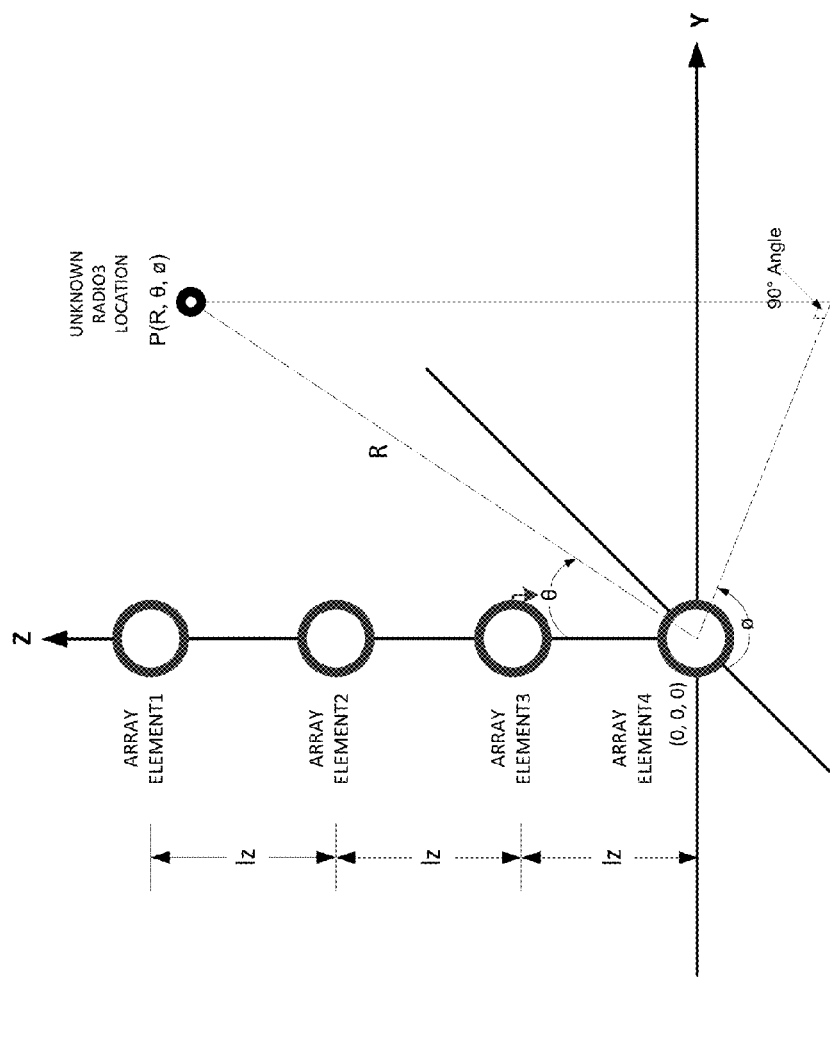
FIG. 6 illustrates an example linear antenna array architecture.
Figure 7:
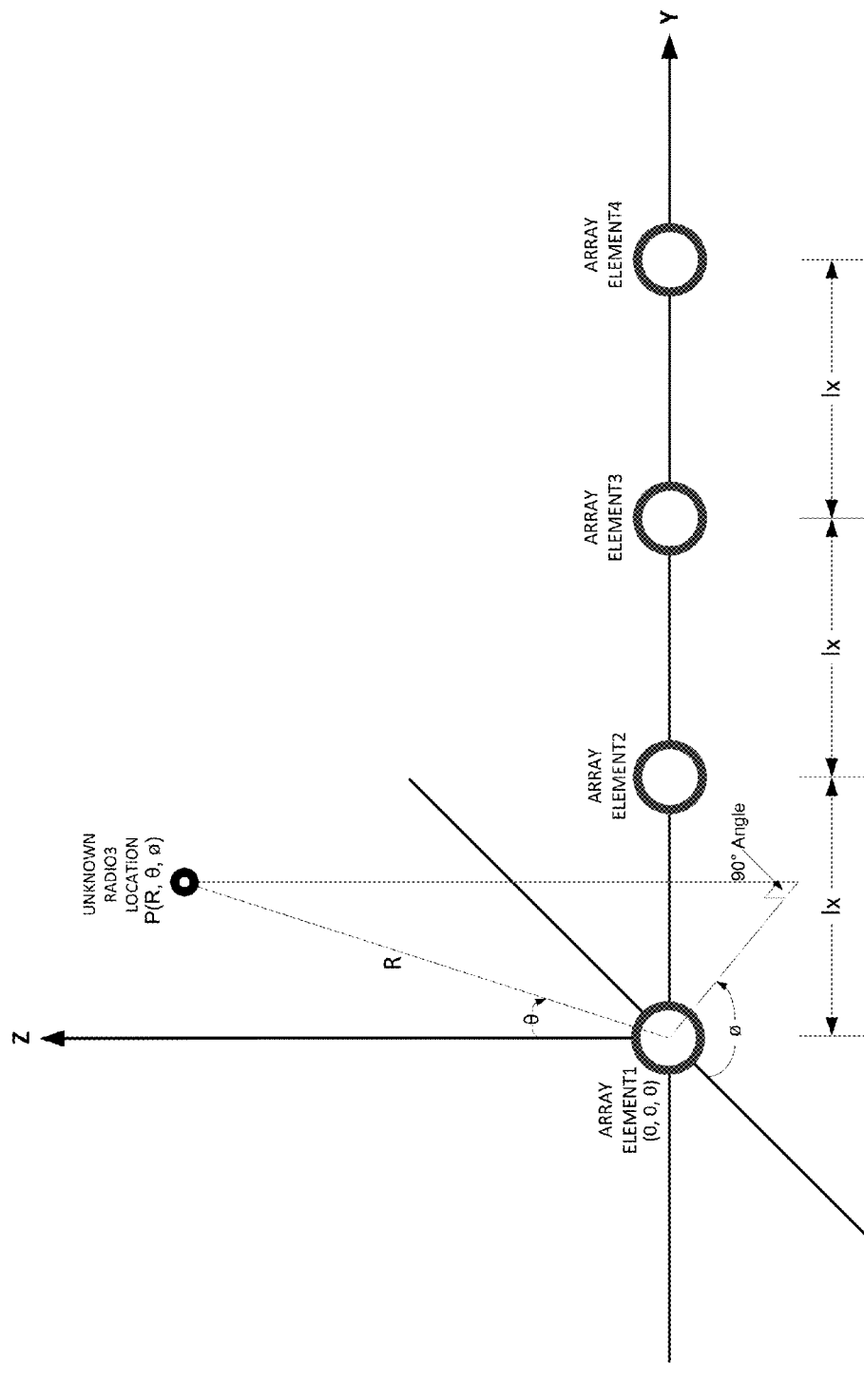
FIG. 7 illustrates an example linear antenna array architecture.

Other antenna array arrangements may also be used. For example, FIG. 6 and FIG. 7 illustrate other example four-element, planar antenna arrays that may be used to determine the location of an unknown radio based on measurement parameters determined during or after interference cancellation. For example, linear antenna arrays similar to the arrays illustrated in FIG. 6 or FIG. 7 may be utilized. Example antenna arrays that may be utilized include linear arrays, circular arrays, and/or arbitrarily shaped planar arrays. Depending on the type of array being utilized, the parameter determinations for the location finding may be simplified.

In an example, the distances between adjacent antenna array elements may be set to be equal lengths, for example to simplify the location determination analysis. For example, $l_{12}$, $l_{23}$, and $l_{34}$ of FIG. 2 may be set to the same distance. In another example, 1x on the x-axis, 1y on the y-axis, and 1z on the z-axis (if any or non-planar) may be set to the same value in FIG. 5.

The parameters θ and/or Ø may be the spherical coordinate parameters corresponding to points located on the surface of a unit hemisphere. When the points on the hemisphere are projected onto a plane parallel to the x-y plane, the direction axis cosines of the plane may be expressed as cos(βx) and cos(βy), respectively, where:

$$\cos(\beta x) = \sin(\theta)\cos(\emptyset) \quad \text{Equation (1)}$$

$$\cos(\beta y) = \sin(\theta)\sin(\emptyset) \quad \text{Equation (2)}$$

The directions of scan may be defined by the direction cosines (e.g., cos(βx) and cos(βy)) where:

$$\tan(\emptyset) = \cos(\beta y)/\cos(\beta x) \quad \text{Equation (3)}$$

The angle θ may be derived using the distance of the coordinate ((cos(βx), cos(βy)) from the origin (0, 0, 0), where the distance from the origin to the coordinate ((cos(βx), cos(βy)) may be equal to sin(θ). In an example, the maximum energy may be radiated into the area inside the unit circle when the following relationship is met:

$$\cos^2(\beta x) + \cos^2(\beta y) \leq 1 \quad \text{Equation (4)}$$

In an example, the phase shifts in any direction on the x-axis, y-axis, and/or z-axis may be expressed as:

$$\emptyset 12 = \Delta(t1-t2) \quad \text{Equation (5a)}$$

$$\emptyset 13 = \Delta(t1-t3) \quad \text{Equation (5b)}$$

$$\emptyset 14 = \Delta(t1-t4) \quad \text{Equation (5c)}$$

where Ø1n may be the relative phase shift for an antenna array element n (e.g., Ø12, Ø13, Ø14) as compared to the signal received via reference antenna array 1, Δ may correspond to either βx, βy, and/or βz, and t1, t2, t3, t4, . . . , tn may be the time taken for the signals to travel the distances R1, R2, R3, R4, . . . , Rn, respectively. Since the relative phase differences Ø12, Ø13, and Ø13 can be determined based on the phase detector analysis described with respect to FIG. 3 and/or based on a relative phase analysis of the resultant SOI1, SOI2, SOI3, and SOI4 signals after interference cancellation in FIG. 4, based on the geography of the antenna array the relative time of arrivals of the different SOI components can be determined.

Using these mathematical relationships, the digital control subsystem may be configured to derive one or more of ($\theta_1$, $\emptyset_1$, t1), ($\theta_2$, $\emptyset_2$, t2-t1), ($\theta_3$, $\emptyset_3$, t3-t1), ($\theta_4$, $\emptyset_4$, t4-t1), up to ($\theta_n$, $\emptyset_n$, tn-t1) to increase the accuracy of the location determination, where n may be the number of elements.

Once these parameters are known, the coordinates of the source radio may be determined, for example based on the known position of the receiver. For example, triangulation may be used to determine the location of the transmitting radio. To increase the accuracy of the location determination, a larger number of array elements may be used.

As noted above, these techniques may also be utilized to determine the position of a receiver that is being interfered with relative to the positions of transmitters whose position is known or fixed. In this case, rather than comparing the SOI as seen by multiple antennas in an antenna array so as to perform triangulation and/or trilateration in order to determine the position of the transmitter, the ICS is used to cancel the interference that is detected when receiving multiple SOIs. Each of the SOIs may be transmitted from a known location. Once the interference cancellation has been performed in order to properly detect each of the SOIs, triangulation and/or trilateration may be performed in order to determine the location of the receiver based on the properties of the received signals of interest (e.g., amplitude, timing, phases shift, angle of arrival, etc.) and the known position of the each of the transmitters that are transmitting the SOIs.

In an example, each antenna of an antenna array may be used to receive one of the signals from the known transmitter locations, and the interference associated with each of the array elements may be serially cancelled using the techniques described herein (e.g., FIG. 2, FIG. 3, FIG. 4, etc.). As may be appreciated, the techniques described herein for performing interference cancellation while determining the position of an unknown transmitter based on signals received from the unknown transmitter and/or while determining the position of the receiver based on signals from known transmitters may be performed separately and/or in combination. Additionally, although an example described herein may be described with reference to determining the position of an unknown transmitter based on signals received from the unknown transmitter, such examples may be equally applicable to determining the position of the receiver based on signals from a known transmitter or known transmitters.

Embodiments may take the form of a tangible computer-usable or computer-readable medium providing program code for use by or in connection with a computer or any instruction execution system. Examples of a computer-usable or computer-readable medium include tangible computer media such as semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. A processor may be configured to execute instructions stored in memory to perform the various functions described herein.

What is claimed:

1. A method for determining a position of a device experiencing interference, the method comprising:
   receiving a plurality of radio frequency (RF) signals from a plurality of transmitters each located at a known position, wherein each respective RF signal of the plurality of RF signals is transmitted from one of the transmitters, and each respective RF signal comprises a respective RF SOI and a respective instance of at least one RF interfering signal;
   determining a sample of the at least one RF interfering signal;
   converting each of the plurality of RF signals to a plurality of optical signals, and converting the sample of the at least one RF interfering signal to at least one optical interfering signal;
   applying a 180 phase shift to the at least one optical interfering signal;
   variably attenuating and variably time delaying the at least one optical interfering signal;
   combining an instance of the at least one optical interfering signal with each of the plurality of optical signals after variably attenuating and variably time delaying the at least one optical interfering signal;
   converting the plurality of optical signals to a second plurality of RF signals after combining the at least one optical interfering signal with each of the plurality of interfering signals; and
   estimating a current position based on the known positions of each of the transmitters and one or more of the relative amplitudes of the second plurality of RF signals, the relative timing differences of the second plurality of RF signals, or the relative phase differences of the second plurality of RF signals.

2. The method as in claim 1, wherein estimating the current position comprises performing trilateration using the second plurality of RF signals.

3. The method as in claim 1, wherein estimating the current position comprises performing triangulation using the second plurality of RF signals.

4. The method as in claim 1, wherein at least one interfering signal comprises a plurality of separate interfering signals.

5. The method as in claim 4, wherein one of the plurality of separate interfering signals is determined based on directly sampling a first interfering signal and another of the plurality of separate interfering signals is determined based on estimating a second interfering signal using a directional antenna.

6. A location determining system comprising:
   a radio frequency subsystem configured to:
      receive a plurality of radio frequency (RF) signals from a plurality of transmitters each located at a known position, wherein each respective RF signal of the plurality of RF signals is transmitted from one of the transmitters, and each respective RF signal comprises a respective RF SOI and a respective instance of an RF interfering signal,
      determining a sample of the RF interfering signal, and
      send the RF interfering signal and each of the plurality of RF signals to an optical subsystem;
   the optical subsystem configured to:
      convert each of the plurality of RF signals to a plurality of optical signals,
      convert the sample of the RF interfering signal to an optical interfering signal,
      apply a 180 phase shift to the optical interfering signal,
      variably attenuate and variably time delay the optical interfering signal,
      combine an instance of the optical interfering signal with each of the plurality of optical signals after variably attenuating and variably time delaying the optical interfering signal, and
      convert the plurality of optical signals to a second plurality of RF signals after combining the optical interfering signal with each of the plurality of interfering signals; and
   a digital subsystem configured to estimate a current position based on the known positions of each of the transmitters and one or more of the relative amplitudes of the second plurality of RF signals, the relative timing differences of the second plurality of RF signals, or the relative phase differences of the second plurality of RF signals.

7. The location determining system as in claim 6, wherein one or more of the plurality of transmitters is located at a respective global positioning system (GPS) satellite.

8. The location determining system as in claim 7, wherein at least one of the plurality of transmitters is located at fixed location that is not a satellite and the RF signal corresponding to the at least one of the plurality of transmitters is used as an error correction signal for correcting a position determination that was based on one or more signals transmitted from GPS satellites.

9. The location determining system as in claim 6, wherein one or more of the plurality of transmitters is located at a cellular base station.

10. The location determining system as in claim 6, wherein the digital system is configured to individually control the attenuation and time delay applied in the optical subsystem for each of the plurality of optical signals.

* * * * *